(12) United States Patent  
Hwang et al.

(10) Patent No.: US 6,469,914 B1
(45) Date of Patent: Oct. 22, 2002

(54) UNIVERSAL PULSE WIDTH MODULATING POWER CONVERTER

(75) Inventors: Jeffrey Hwang, Saratoga, CA (US); Calvin Hsu, San Mateo, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 0 days.

(21) Appl. No.: 09/971,844

(22) Filed: Oct. 4, 2001

Related U.S. Application Data

(60) Division of application No. 09/436,074, filed on Nov. 8, 1999, now Pat. No. 6,344,980, and a continuation-in-part of application No. 09/231,523, filed on Jan. 14, 1999, now Pat. No. 6,091,233.

(51) Int. Cl.[7] .............................................. H02M 3/335
(52) U.S. Cl. .................................................. 363/21.01
(58) Field of Search ........................ 363/16, 20, 21.01, 363/21.04, 95, 97, 131; 323/301, 303

(56) References Cited

U.S. PATENT DOCUMENTS

| | | | |
|---|---|---|---|
| 2,483,815 A | 10/1949 | Easton | 175/356 |
| 2,967,267 A | 1/1961 | Steinman et al. | 317/101 |
| 3,292,579 A | 12/1966 | Buchanan | 119/5 |
| 3,294,981 A | 12/1966 | Bose | 307/88.5 |
| 3,539,902 A | 11/1970 | Hickling | 321/9 |
| 3,549,990 A | 12/1970 | Hochheiser | 323/44 |
| 3,603,809 A | 9/1971 | Uchiyama | 307/228 |
| 3,611,021 A | 10/1971 | Wallace | 315/239 |
| 3,660,753 A | 5/1972 | Judd et al. | 323/22 T |
| 3,671,782 A | 6/1972 | Wittlinger et al. | 307/238 |
| 3,723,891 A | 3/1973 | Whiteley | 329/103 |
| 3,742,330 A | 6/1973 | Hodges et al. | 321/9 A |
| 3,758,823 A | 9/1973 | Jett et al. | 315/219 |
| 3,772,625 A | 11/1973 | Raupach | 336/94 |
| 3,778,677 A | 12/1973 | Kriege | 315/219 |

(List continued on next page.)

FOREIGN PATENT DOCUMENTS

| | | | |
|---|---|---|---|
| DE | 32 33 655 A1 | 5/1983 | H05B/41/29 |
| DE | 34 32 266 A1 | 3/1985 | H05B/41/26 |
| EP | 0 059 064 | 9/1982 | H05B/41/26 |

(List continued on next page.)

OTHER PUBLICATIONS

J. Williams, "Techniques for 92% Efficient LCD Illumination" *Linear Technology Application Note 55*, pp. 1–43, Aug. 1993.

(List continued on next page.)

Primary Examiner—Matthew Nguyen
(74) Attorney, Agent, or Firm—Haverstock & Owens LLP

(57) ABSTRACT

A controller for a pulse width modulating (PWM) power converter. The controller monitors an output voltage and a current through a magnetic element for modulating a duty cycle of a main power switch. The controller is an eight-pin integrated circuit which controls either a forward converter or a post regulator without internal modifications. The monitored current of the forward converter forms a positive sensing signal. The monitored current of the post regulator forms a negative sensing signal. A current sense circuit of the controller forms an absolute value of either sensing signal. A soft-start circuit of the controller forms a start-up voltage ramp which is proportional to the level of a $V_{cc}$ supply without requiring an external capacitor. A duty cycle of the main switch is gradually increased by comparing the start-up voltage ramp to the absolute value of the sensing signal. A pulse skipping circuit of the controller disables switching of the main switch under light load conditions. An error signal representative of a difference between the output voltage and a desired output voltage is compared to a pulse skip reference voltage. When the error signal falls below the reference voltage, the main switch is disabled. Because the pulse skip reference voltage is inversely related to the $V_{cc}$ supply, pulsing of the main switch under light load conditions is spread out in time. A clock signal utilized to control switching of the main switch is generated internally or externally to the integrated circuit.

8 Claims, 16 Drawing Sheets

U.S. PATENT DOCUMENTS

| | | | |
|---|---|---|---|
| 3,810,026 A | 5/1974 | Roth | 328/127 |
| 3,828,203 A | 8/1974 | Belson et al. | 307/228 |
| 3,832,643 A | 8/1974 | Van Heyningen et al. | 330/15 |
| 3,840,795 A | 10/1974 | Roszyk et al. | 320/2 |
| 3,883,756 A | 5/1975 | Dragon | 307/265 |
| 3,893,036 A | 7/1975 | Cavoretto et al. | 327/136 |
| 3,921,005 A | 11/1975 | Watrous | 307/64 |
| 3,953,768 A | 4/1976 | Meredith et al. | 317/31 |
| 4,030,058 A | 6/1977 | Riffe et al. | 336/92 |
| 4,031,449 A | 6/1977 | Trombly | 320/2 |
| 4,035,710 A | 7/1977 | Joyce | 363/37 |
| 4,038,625 A | 7/1977 | Tompkins et al. | 336/83 |
| 4,063,108 A | 12/1977 | Klett et al. | 307/64 |
| 4,127,795 A | 11/1978 | Knoll | 315/210 |
| 4,144,462 A | 3/1979 | Sieron et al. | 307/66 |
| 4,145,592 A | 3/1979 | Mizukawa et al. | 219/10.49 R |
| 4,146,857 A | 3/1979 | Schleupen | 336/61 |
| 4,163,923 A | 8/1979 | Herbers et al. | 315/208 |
| 4,172,981 A | 10/1979 | Smith | 307/66 |
| 4,207,498 A | 6/1980 | Spira et al. | 315/97 |
| 4,210,846 A | 7/1980 | Capewell et al. | 315/121 |
| 4,225,825 A | 9/1980 | Watts | 328/185 |
| 4,251,752 A | 2/1981 | Stolz | 315/206 |
| 4,260,943 A | 4/1981 | Zaderej et al. | 320/21 |
| 4,277,726 A | 7/1981 | Burke | 315/98 |
| 4,277,728 A | 7/1981 | Stevens | 315/307 |
| 4,293,904 A | 10/1981 | Brooks et al. | 363/86 |
| 4,297,614 A | 10/1981 | Chandler | 315/86 |
| 4,303,902 A | 12/1981 | Lesster et al. | 336/83 |
| 4,311,954 A | 1/1982 | Capel | 323/222 |
| 4,318,608 A | 3/1982 | Payne | 355/3 CH |
| 4,390,844 A | 6/1983 | Ting | 328/142 |
| 4,392,103 A | 7/1983 | O'Sullivan et al. | 323/222 |
| 4,407,588 A | 10/1983 | Arichi et al. | 368/118 |
| 4,412,265 A | 10/1983 | Buuck | 361/18 |
| 4,414,493 A | 11/1983 | Henrich | 315/308 |
| 4,422,138 A | 12/1983 | Kornrumpf | 363/21 |
| 4,437,146 A | 3/1984 | Carpenter | 363/21 |
| 4,441,053 A | 4/1984 | Daspit | 315/206 |
| 4,441,054 A | 4/1984 | Bay | 315/219 |
| 4,453,109 A | 6/1984 | Stupp et al. | 315/219 |
| 4,454,558 A | 6/1984 | Huddart | 361/153 |
| 4,456,872 A | 6/1984 | Froeschle | 323/286 |
| 4,486,689 A | 12/1984 | Davis et al. | 315/92 |
| 4,495,446 A | 1/1985 | Brown et al. | 315/206 |
| 4,496,896 A | 1/1985 | Melocik et al. | 320/2 |
| 4,498,031 A | 2/1985 | Stupp et al. | 315/307 |
| 4,523,131 A | 6/1985 | Zansky | 315/307 |
| 4,528,482 A | 7/1985 | Merlo | 315/291 |
| 4,529,927 A | 7/1985 | O'Sullivan et al. | 323/222 |
| 4,543,556 A | 9/1985 | Taylor et al. | 336/210 |
| 4,572,988 A | 2/1986 | Handler et al. | 315/209 R |
| 4,585,974 A | 4/1986 | Stupp et al. | 315/307 |
| 4,604,552 A | 8/1986 | Alley et al. | 315/176 |
| 4,612,479 A | 9/1986 | Zansky | 315/194 |
| 4,628,438 A | 12/1986 | Montague | 363/134 |
| 4,651,231 A | 3/1987 | Douglas, Jr. | 358/342 |
| 4,654,573 A | 3/1987 | Rough et al. | 320/2 |
| 4,661,896 A | 4/1987 | Kobayashi et al. | 363/24 |
| 4,672,300 A | 6/1987 | Harper | 323/222 |
| 4,672,303 A | 6/1987 | Newton | 323/285 |
| 4,672,518 A | 6/1987 | Murdock | 363/21 |
| 4,674,020 A | 6/1987 | Hill | 363/21 |
| 4,677,366 A | 6/1987 | Wilkinson et al. | 323/222 |
| 4,685,043 A | 8/1987 | Mehnert | 363/43 |
| 4,686,427 A | 8/1987 | Burke | 315/219 |
| 4,691,159 A | 9/1987 | Ahrens et al. | 323/222 |
| 4,695,935 A | 9/1987 | Oen et al. | 363/21 |
| 4,698,554 A | 10/1987 | Stupp et al. | 315/307 |
| 4,700,113 A | 10/1987 | Stupp et al. | 315/224 |
| 4,704,563 A | 11/1987 | Hussey | 315/307 |
| 4,717,833 A | 1/1988 | Small | 307/44 |
| 4,717,863 A | 1/1988 | Zeiler | 315/307 |
| 4,723,098 A | 2/1988 | Grubbs | 315/306 |
| 4,731,574 A | 3/1988 | Melbert | 323/275 |
| 4,736,151 A | 4/1988 | Dishner | 323/224 |
| 4,737,853 A | 4/1988 | Graves et al. | 358/190 |
| 4,739,227 A | 4/1988 | Anderson | 315/260 |
| 4,755,922 A | 7/1988 | Puvogel | 363/21 |
| 4,761,725 A | 8/1988 | Henze | 363/46 |
| 4,763,239 A | 8/1988 | Ball | 363/98 |
| 4,791,546 A | 12/1988 | Carroll | 363/95 |
| 4,794,508 A | 12/1988 | Carroll | 363/95 |
| 4,800,328 A | 1/1989 | Bolger et al. | 320/2 |
| 4,801,859 A | 1/1989 | Dishner | 323/224 |
| 4,806,880 A | 2/1989 | Laws | 331/8 |
| 4,837,495 A | 6/1989 | Zansky | 323/222 |
| 4,841,220 A | 6/1989 | Tabisz et al. | 323/282 |
| 4,845,420 A | 7/1989 | Oshizawa et al. | 323/222 |
| 4,874,989 A | 10/1989 | Nilssen | 315/151 |
| 4,886,952 A | 12/1989 | Horiuchi | 219/10.77 |
| 4,893,059 A | 1/1990 | Nilssen | 315/127 |
| 4,896,077 A | 1/1990 | Dodd et al. | 315/289 |
| 4,920,299 A | 4/1990 | Presz et al. | 315/98 |
| 4,920,309 A | 4/1990 | Szepesi | 323/269 |
| 4,929,882 A | 5/1990 | Szepesi | 323/222 |
| 4,935,669 A | 6/1990 | Nilssen | 315/105 |
| 4,940,929 A | 7/1990 | Williams | 323/222 |
| 4,941,080 A | 7/1990 | Sieborger | 363/127 |
| 4,942,352 A | 7/1990 | Sano | 320/2 |
| 4,947,309 A | 8/1990 | Jonsson | 363/17 |
| 4,950,974 A | 8/1990 | Pagano | 323/222 |
| 4,952,849 A | 8/1990 | Fellows et al. | 315/307 |
| 4,962,344 A | 10/1990 | Bohrer | 307/260 |
| 4,964,026 A | 10/1990 | Locascio | 363/39 |
| 4,975,823 A | 12/1990 | Rilly et al. | 363/56 |
| 5,015,919 A | 5/1991 | Vila-Masot et al. | 315/86 |
| 5,028,861 A | 7/1991 | Pace et al. | 323/222 |
| 5,034,873 A | 7/1991 | Feldtkeller | 363/21 |
| 5,045,732 A | 9/1991 | Sugiura et al. | 307/529 |
| 5,048,033 A | 9/1991 | Donahue et al. | 372/38 |
| 5,049,790 A | 9/1991 | Herfurth et al. | 315/291 |
| 5,070,439 A | 12/1991 | Remson | 363/22 |
| 5,070,856 A * | 12/1991 | Koiwa | 123/609 |
| 5,111,118 A | 5/1992 | Fellows et al. | 315/307 |
| 5,132,606 A | 7/1992 | Herbert | 323/266 |
| 5,138,249 A | 8/1992 | Capel | 323/283 |
| 5,146,399 A | 9/1992 | Gucyski | 363/89 |
| 5,157,269 A | 10/1992 | Jordan et al. | 307/59 |
| 5,161,097 A | 11/1992 | Ikeda | 363/124 |
| 5,177,408 A | 1/1993 | Marques | 315/291 |
| 5,202,608 A | 4/1993 | Johnson | 315/86 |
| 5,214,352 A | 5/1993 | Love | 315/86 |
| 5,216,402 A | 6/1993 | Carosa | 336/66 |
| 5,237,242 A | 8/1993 | Takahashi et al. | 315/123 |
| 5,264,776 A | 11/1993 | Hulsey | 320/2 |
| 5,272,613 A | 12/1993 | Büthker | 363/21 |
| 5,278,490 A | 1/1994 | Smedley | 323/284 |
| 5,287,261 A | 2/1994 | Ehsani | 363/124 |
| 5,331,291 A * | 7/1994 | D'Agostino et al. | 330/289 |
| 5,349,284 A | 9/1994 | Whittle | 323/207 |
| 5,359,281 A | 10/1994 | Barrow et al. | 323/284 |
| 5,363,020 A | 11/1994 | Chen et al. | 315/209 R |
| 5,367,223 A | 11/1994 | Eccher | 315/97 |
| 5,367,224 A | 11/1994 | Pacholok | 315/219 |

U.S. PATENT DOCUMENTS

| | | | |
|---|---|---|---|
| 5,367,242 A | 11/1994 | Hulman | 320/2 |
| 5,384,516 A | 1/1995 | Kawabata et al. | 315/160 |
| 5,394,020 A | 2/1995 | Nienaber | 327/134 |
| 5,397,976 A | 3/1995 | Madden et al. | 323/222 |
| 5,408,162 A | 4/1995 | Williams | 315/224 |
| 5,410,188 A | 4/1995 | Segaram | 327/237 |
| 5,410,221 A | 4/1995 | Mattas et al. | 315/307 |
| 5,412,308 A | 5/1995 | Brown | 323/267 |
| 5,414,341 A | 5/1995 | Brown | 323/268 |
| 5,430,364 A | 7/1995 | Gibson | 323/207 |
| 5,434,767 A | 7/1995 | Batarseh et al. | 363/16 |
| 5,436,550 A | 7/1995 | Arakawa | 323/222 |
| 5,440,473 A | 8/1995 | Ishii et al. | 363/21 |
| 5,450,000 A | 9/1995 | Olsen | 323/222 |
| 5,457,621 A | 10/1995 | Munday et al. | 363/56 |
| 5,457,622 A | 10/1995 | Arakawa | 363/59 |
| 5,461,302 A | 10/1995 | Garcia et al. | 323/222 |
| 5,477,132 A | 12/1995 | Canter et al. | 323/282 |
| 5,479,089 A | 12/1995 | Lee | 323/283 |
| 5,481,178 A | 1/1996 | Wilcox et al. | 323/287 |
| 5,485,361 A | 1/1996 | Sokal | 363/21 |
| 5,491,445 A | 2/1996 | Moller et al. | 327/540 |
| 5,502,370 A | 3/1996 | Hall et al. | 323/284 |
| 5,517,399 A | 5/1996 | Yamauchi et al. | 363/89 |
| 5,532,577 A | 7/1996 | Doluca | 323/282 |
| 5,552,695 A | 9/1996 | Schwartz | 323/271 |
| 5,565,761 A | 10/1996 | Hwang | 323/222 |
| 5,568,041 A | 10/1996 | Hesterman | 323/207 |
| 5,570,276 A | 10/1996 | Cuk et al. | 363/16 |
| 5,592,071 A | 1/1997 | Brown | 323/282 |
| 5,592,128 A | 1/1997 | Hwang | 331/61 |
| 5,610,502 A | 3/1997 | Tallant, II et al. | 323/222 |
| 5,617,013 A | 4/1997 | Cozzi | 323/222 |
| 5,617,306 A | 4/1997 | Lai et al. | 363/17 |
| 5,627,460 A | 5/1997 | Bazinet et al. | 323/288 |
| 5,642,066 A | 6/1997 | Burke | 327/132 |
| 5,663,874 A | 9/1997 | Mader et al. | 363/21 |
| 5,691,592 A | 11/1997 | Gunderson et al. | 310/317 |
| 5,691,889 A | 11/1997 | Bazinet et al. | 363/89 |
| 5,708,572 A | 1/1998 | Bergk | 363/21 |
| 5,742,151 A | 4/1998 | Hwang | 323/222 |
| 5,747,977 A | 5/1998 | Hwang | 323/284 |
| 5,771,164 A | 6/1998 | Murai et al. | 363/89 |
| 5,798,635 A | 8/1998 | Hwang et al. | 323/222 |
| 5,804,950 A | 9/1998 | Hwang et al. | 323/222 |
| 5,818,207 A | 10/1998 | Hwang | 323/288 |
| 5,847,548 A | 12/1998 | He et al. | 323/222 |
| 5,861,734 A | 1/1999 | Fasullo et al. | 323/222 |
| 5,894,243 A | 4/1999 | Hwang | 327/540 |
| 5,903,447 A * | 5/1999 | Takahashi et al. | 363/21 |
| 6,115,265 A | 9/2000 | Barlage | 363/21 |

FOREIGN PATENT DOCUMENTS

| | | | |
|---|---|---|---|
| EP | 0 178 852 | 4/1986 | H05B/41/26 |
| JP | 60-22490 | 2/1985 | 5/41 |
| WO | WO 92/01334 | 1/1992 | H03K/3/281 |
| WO | WO 96/07960 | 3/1996 | |

OTHER PUBLICATIONS

Micro Linear, "ML4874 LCD Backlight Lamp Driver," pp. 1–6, Apr. 1994.

Micro Linear, "ML4876 LCD Backlight Lamp Driver with Contrast," pp. 1–6, Apr. 1994.

U. Mader, et al., Micro Linear, "Application Note 26—Power Conversion Efficiencies for Miniature Fluorescent Lamp," pp. 1–6, Feb. 1994.

K. Kit Sum, et al., Micro Linear, "Application Note 32—Theory and Application of the ML4874 and ML4876 LCD Backlight Controller ICs," pp. 1–12, Jun. 1994.

J. J. LoCascio and U. H. Mader, "A New Control Technique Uses 25% Less Power To Drive Miniature Cold Cathode Fluorescent Lamps," *Electronic Ballast*, pp. 60–69, Apr. 1994.

M. Jordan and J.A. O'Connor, "Resonant Fluorescent Lamp Converter Provides Efficient and Compact Solution," *IEEE*, pp. 424–431, 1993.

Maxim Integrated Products, "CCFT Backlight and LCD Contrast Controllers—MAX753/MAX754," pp. 1–12, Feb. 1994.

K. Kit Sum, Micro Linear, "ML4874 Evaluation Kit User's Guide—LCD Backlight Lamp Driver," pp. 1–5, Apr. 1994.

Micro Linear, "ML4864 Evaluation User's Guide—LCD Backlight Lamp Driver with Contrast Control," pp. 1–4, Jan. 1994.

Micro Linear, "ML4864 LCD Backlight Lamp Driver with Contrast Control," pp. 1–6, Nov. 1993.

Micro Linear, "Advance Information ML–4830 Electronic Ballast Controller", Jun. 1992.

Micro Linear, "Advance Information ML–4830 Electronic Ballast Controller", Jul. 1992.

"ML 4824 Power Factor Correction and PWM Controller Combo," Micro Linear Corporation, May 1997.

"Load Share Controller, UC1902, UC2902, UC3902: Preliminary," Unitrode Integrated Circuits, Merrimack, NH, Oct. 1996.

"Nonlinear–Carrier Control for High Power Factor Rectifiers Based On Flyback, Cuk, or Sepic Converters," R. Zane and D. Maksimovic, Applied Power Electronics Conf., pp. 814–820, 1996.

"ML4880 Portable PC/PCMCIA Power Controller (Preliminary)," Micro Linear Corporation, Oct. 1995.

"ML4863 High Efficiency Flyback Controller," Micro Linear Corporation, Feb. 1995.

"ML4863EVAL User's Guide High Efficiency Flyback Controller," Micro Linear Corporation, Feb. 1995.

"Nonlinear–Carrier Control for High Power Factor Boost Rectifiers," D. Maksimovic, Y. Jang, R. Erikson, Applied Power Electronics Conf., pp. 635–641, 1995.

"ML4823 High Frequency Power Supply Controller," Micro Linear Corporation, Dec. 1994.

"Load Share Controller, UC1907, UC2907, UC3907," Unitrode Integrated Circuits, Merrimack, NH, Nov. 1994.

"Off–Line And One–Cell IC Converters Up Efficiency," Frank Goodenough, Electronic Design, pp. 55–56, 58, 60, 62–64, Jun. 27, 1994.

"ML4863 High Efficiency Battery Pack Converter (Preliminary)," Micro Linear Corporation, Jun. 1994.

"Designing with hysteretic current–mode control," Gedaly Levin and Kieran O'Malley, Cherry Semi–Conductor Corp., EDN, pp. 95–96, 98, 100–102, Apr. 28, 1994.

"Step–Up/Step Down Converters Power Small Portable Systems," Bruce D. Moore, EDN, pp. 79–84, Feb. 3, 1994.

"ML4861 Low Voltage Boost Regulator," Micro Linear Corporation, Jun. 1993.

"11. Variable Frequency Converters," K. Kit Sum, pp. 96–97, 134–135, 1993.

"3.3V/5V/Adjustable Output, Step–Up, DC–DC Converters," Maxim Integrated Products, pp. 1–8, 1993.

"ML4821EVAL Average Current PFC Controller Evaluation Kit," Micro Linear Corporation, p. 6–127, Jul. 1992.

"ML4821 Power Factor Controller," Micro Linear Corporation, Jun. 1992.

"Application Note 16—Theory and Application of the ML4821 Average Current Mode PFC Controller," Micro Linear Corporation, Jan. 1992.

"Small–Signal High–Frequency Analysis Of The Free–Running Current–Mode–Controller Converter," Richard Redl, pp. 897–906, IEEE, 1991.

"Analysis of the Flyback Converter Operating in Current–Mode Pulse–Frequency Modulation," Urs Mader and K. Kit Sum, Micro Linear Corporation, Apr. 17, 1994.

"System–Engineered Portable Power Supplies Marry Improved Efficiency And Lower Cost," Bruce D. Moore, Maxim Integrated Products, Mar. 1995.

"CD 54/74 HC 4046A Technical Data," RCA, Oct. 1994.

* cited by examiner

US 6,469,914 B1

UNIVERSAL PULSE WIDTH MODULATING POWER CONVERTER

RELATED APPLICATION

This is a divisional of U.S. patent application Ser. No. 09/436,074 filed on Nov. 8, 1999 now U.S. Pat. No. 6,394, 980, and a CIP of 09/231,523 filed on Jan. 14, 1999, now U.S. Pat. No. 6,091,233the contents of which are hereby incorporated by reference.

FIELD OF THE INVENTION

The invention relates to the field of switching electrical power converters. More particularly, the invention relates to the field of pulse width modulating forward converters and post regulators.

BACKGROUND OF THE INVENTION

FIG. 1 illustrates a schematic block diagram of a conventional pulse width modulating (PWM) forward converter. As illustrated in FIG. 1, a voltage source $V_S$ is coupled to a first terminal of a primary winding of a transformer T. A second terminal of the primary winding of the transformer T is coupled to a drain of a MOS transistor M. A source of the transistor M is coupled to a first terminal of a resistor $R_{SENSE}$. A second terminal of the resistor $R_{SENSE}$ is coupled to a first ground node. A voltage signal $I_{SENSE}$ formed at the first terminal of the resistor $R_{SENSE}$ is representative of a level of current passing through the primary winding of the transformer T when the transistor M is active.

A first terminal of a secondary winding of the transformer T is coupled to an anode of a diode D. A cathode of the diode D is coupled to a first terminal of a capacitor $C_1$, to an output node, and to a first terminal of a resistor $R_1$. A second terminal of the secondary winding of the transformer T and a second terminal of the capacitor $C_1$ are coupled to a second ground node. A second terminal of the resistor $R_1$ is coupled to a first terminal of a resistor $R_2$ and to an inverting input of an error amplifier A. A second terminal of the resistor $R_2$ is coupled to the second ground node. The resistors $R_1$ and $R_2$ form a resistive divider for supplying the amplifier A with a signal which is proportional to an output voltage $V_{OUT}$ at the output node. The amplifier A can include optical elements so as to optically isolate the first ground node from the second ground node.

A non-inverting input of the amplifier A is coupled to a reference voltage $V_{REF}$. The reference voltage $V_{REF}$ is representative of a desired level for the output voltage $V_{OUT}$. An output of the amplifier A forms an error signal $V_{EA}$ and is coupled to a non-inverting input of a comparator $CMP_1$. The error signal $V_{EA}$ is representative of a difference between the output voltage $V_{OUT}$ and a desired level for the output voltage. The first terminal of the resistor $R_{SENSE}$ is coupled to an inverting input of the comparator $CMP_1$ and to an inverting input of a comparator $CMP_2$. An output of the comparator $CMP_1$ is coupled to a first input of a logic NAND gate $U_1$. A current source is coupled to a first terminal of a capacitor $C_2$ and to a non-inverting input of the comparator $CMP_2$. A second terminal of the capacitor $C_2$ is coupled to the first ground node. A voltage signal $V_{START}$ is formed at the first terminal of the capacitor $C_2$.

An output of the comparator $CMP_2$ is coupled to a second input of the NAND gate $U_1$. An output of the NAND gate $U_1$ is coupled to a set input S of a flip-flop $U_2$. A reset input R of the flip-flop $U_2$ is coupled to receive a clock signal $V_{CLK}$. An inverted output $\overline{Q}$ of the flip-flop $U_2$ is coupled to a gate of the transistor M.

When the transistor M is active (turned on), current flows from the source $V_S$ and through the primary winding of the transformer T. This stores energy as an electromagnetic field associated with the primary winding of the transformer T. When the transistor M is inactive (turned off), the electromagnetic field collapses. By turning the transistor M on and off, energy is transferred to the secondary winding of the transformer T which induces a current to flow in the secondary winding. The current in the secondary winding of the transformer T is rectified by the diode D so as to form a voltage across the capacitor $C_1$. A duty cycle utilized for operating the transistor M controls the level of the output voltage $V_{OUT}$ formed at the output node.

FIGS. 2a–b illustrate timing diagrams for the signals $V_{EA}$, $I_{SENSE}$ and $V_{CLK}$ of the PWM forward converter illustrated in FIG. 1. When the clock signal $V_{CLK}$ transitions from a logical low voltage to a logical high voltage, the output $\overline{Q}$ of the flip-flop $U_2$ transitions to a logic high voltage. This turns on the transistor M. Under these conditions, current flows through the transistor M and the resistor $R_{SENSE}$, as illustrated in FIG. 2a by the signal $I_{SENSE}$ ramping up. When the signal $I_{SENSE}$ reaches the level of the error signal $V_{EA}$, this causes the output of the comparator $CMP_1$ to change from a logic high voltage to a logic low voltage. As a result, the output of the NAND gate $U_1$ changes from a logic low voltage to a logic high voltage and the output $\overline{Q}$ of the flip-flop $U_2$ transitions from. a logic high voltage to a logic low voltage. This turns off the transistor M. Upon a next transition of the clock signal $V_{CLK}$, this cycle repeats. Note that as the error signal $V_{EA}$ increases, the transistor M stays on for a longer portion of each cycle of the clock signal $V_{CLK}$ because more time is required for the signal $I_{SENSE}$ to exceed the error signal $V_{EA}$. Conversely, as the error signal $V_{EA}$ falls, the transistor M stays on a smaller portion of each cycle of the clock signal $V_{CLK}$ because less time is required for the error signal $I_{SENSE}$ to exceed the error signal $V_{EA}$. Accordingly, the output voltage at the node $V_{OUT}$ is regulated to the desired level by adjusting the duty cycle of the transistor M according to requirements of a load (not shown) which can be coupled to the output node to receive the output voltage $V_{OUT}$.

Under normal operating conditions, the voltage $V_{START}$ is at a higher level than the error signal $V_{EA}$. Accordingly, the output of the comparator $CMP_2$ is a logic high voltage when the output of the comparator $CMP_1$ changes. Therefore, under normal operating conditions, the output of the comparator $CMP_2$ does not affect the duty cycle of the transistor M and the PWM converter operates as described above.

Upon start up, however, the output voltage $V_{OUT}$ is low. As a result, the error signal $V_{EA}$ is relatively large. In absence of soft-start circuit elements, including the current source I, the capacitor $C_2$ and the comparator $CMP_2$, this large error signal would result in the transistor M being held on for a large portion of each cycle of the clock signal $V_{CLK}$ while the forward converter attempted to rapidly increase the output voltage to the desired level. As a result, excessive current would flow through the transistor M which would tend to cause premature failure of the transistor M.

Instead, upon start up, the current source I is turned on and the signal $V_{START}$ slowly ramps up. Before the level of the signal $V_{START}$ exceeds the level of the signal $V_{EA}$, the duty cycle of the transistor M is not influenced by the signal $V_{EA}$, but by the signal $V_{START}$. As a result, the duty cycle of the transistor M gradually increases until the level of the signal $V_{START}$ exceeds the level of the error signal $V_{EA}$.

While the soft-start circuit elements of FIG. 1 provide a useful function, they also result in a disadvantage, especially when elements of the forward converter are incorporated into an integrated circuit. More particularly, so that the signal $V_{START}$ ramps up slowly, the current produced by the current source I must be small in relation to the size of the capacitor $C_2$. This constraint either requires that the capacitor $C_2$ be external to the integrated circuit, which increases the pin count of the integrated circuit and, thus, the cost of producing the integrated circuit, or requires that the current produced by the current source I be so small as to be easily overwhelmed by noise and other transient signals, which reduces reliability.

Therefore, what is needed is improved soft-start technique for a PWM power converter.

Further, prior integrated circuits for controlling PWM power converters have been specifically tailored to the intended application. For example, a different integrated circuit design is utilized for a PWM forward converter than is utilized for a PWM post-regulator.

This requirement of multiple integrated circuit designs tends to increase the costs associated with each.

Therefore, what is needed is a universal integrated circuit for controlling a PWM power converter.

SUMMARY OF THE INVENTION

The invention is a universal controller for a pulse width modulating (PWM) power converter. The controller monitors an output voltage of the power converter and a current through a magnetic element of the power converter for modulating a duty cycle of a main power switch of the power converter. The main power switch is closed in response to a transition in a clock signal. When the main power switch is closed, the current through the magnetic element forms a sensing signal (current ramp) representative of the current through the main power switch. The sensing signal is compared to an error signal representative of a difference between the output voltage and a desired level for the output voltage. When the It sensing signal exceeds the error signal, the main power switch is opened. Opening and closing of the main power switch draws power from an input voltage source for forming the output voltage. In this manner, the duty cycle of the main power switch is controlled in a feedback loop. In a preferred embodiment, the controller is implemented as an eight pin mintegrated circuit.

According to an aspect of the present invention, the controller can be utilized for a power converter which is either a PWM forward converter or a PWM post regulator where differences between the PWM forward converter and the PWM post regulator are exclusively in circuitry external to the controller. In particular, the magnetic element of the power converter is a transformer, the main power switch for the PWM forward converter controls a current through a primary side of the transformer, whereas, the main power switch for the PWM post regulator controls a current through the secondary side of the transformer. When the power converter is a PWM forward converter, the sensing signal is positive in polarity, whereas, when the power converter is a PWM post regulator, the sensing signal is negative is polarity. A current sense circuit included in the controller forms a signal which is representative of the absolute value of the sensing signal for comparison to the error signal.

According to another aspect of the present invention, the controller includes a soft-start circuit which gradually increases a duty cycle of the main power switch upon start-up of the power converter. The soft-start circuit monitors the ramping up of a $V_{CC}$ power supply and, in response, forms a start-up voltage ramp. The start-up voltage ramp begins ramping when the $V_{CC}$ power supply reaches a first predetermined voltage level and is substantially proportional to a level of the $V_{CC}$ power supply as the level of $V_{CC}$ exceeds the first predetermined voltage level. In a preferred embodiment, the start-up voltage ramp is formed by generating a current which is substantially proportional to the level of the $V_{CC}$ supply (minus the first predetermined voltage level) and by applying this current to a resistor, such that the start-up voltage ramp is formed across the resistor. During start-up, the start-up voltage ramp is compared to the current ramp for controlling the duty cycle of the main power switch. As a result, the duty cycle gradually increases upon start-up as the level of the voltage supply increases. Unlike prior arrangements, the start-up circuit does not require an external capacitor for forming the start-up voltage ramp. This reduces the number pins required when the controller as implemented as an integrated circuit.

According to a further aspect of the present invention, a pulse skipping circuit disables switching of the main power switch when a load powered by the power converter draws a low level of current. When the output voltage rises, as tends to occur when the load draws a low level of current, the error signal decreases. The error signal is compared to a pulse skip reference voltage. When the level of the error signal falls below the level of the pulse skip reference voltage, then the main power switch is disabled until the error signal rises again. Preferably, the pulse skip reference voltage is inversely related to the supply voltage $V_{CC}$. Accordingly, when the supply voltage $V_{CC}$ is at a higher level, the output voltage must rise to a higher level before the main power switch is disabled than when the supply voltage $V_{CC}$ is at a lower level. Therefore, forming the pulse skip reference voltage such that it is inversely related to the supply voltage tends to aid in spreading out in time pulsing of the main power switch under light load conditions. This tends to reduce switching noise while increasing efficiency.

According to yet another aspect of the present invention, the clock signal which is utilized to control switching of the main power switch can be selectively generated internally to the integrated circuit or externally to the integrated circuit. It is expected that when the power converter is a PWM forward converter, the clock signal is internally generated, whereas, when the power converter is a PWM post regulator, the clock signal is externally generated for synchronizing switching of the PWM post regulator with that of a pre-regulator.

DETAILED DESCRIPTION OF THE PREFERRED EMBODIMENT

Figure 1:
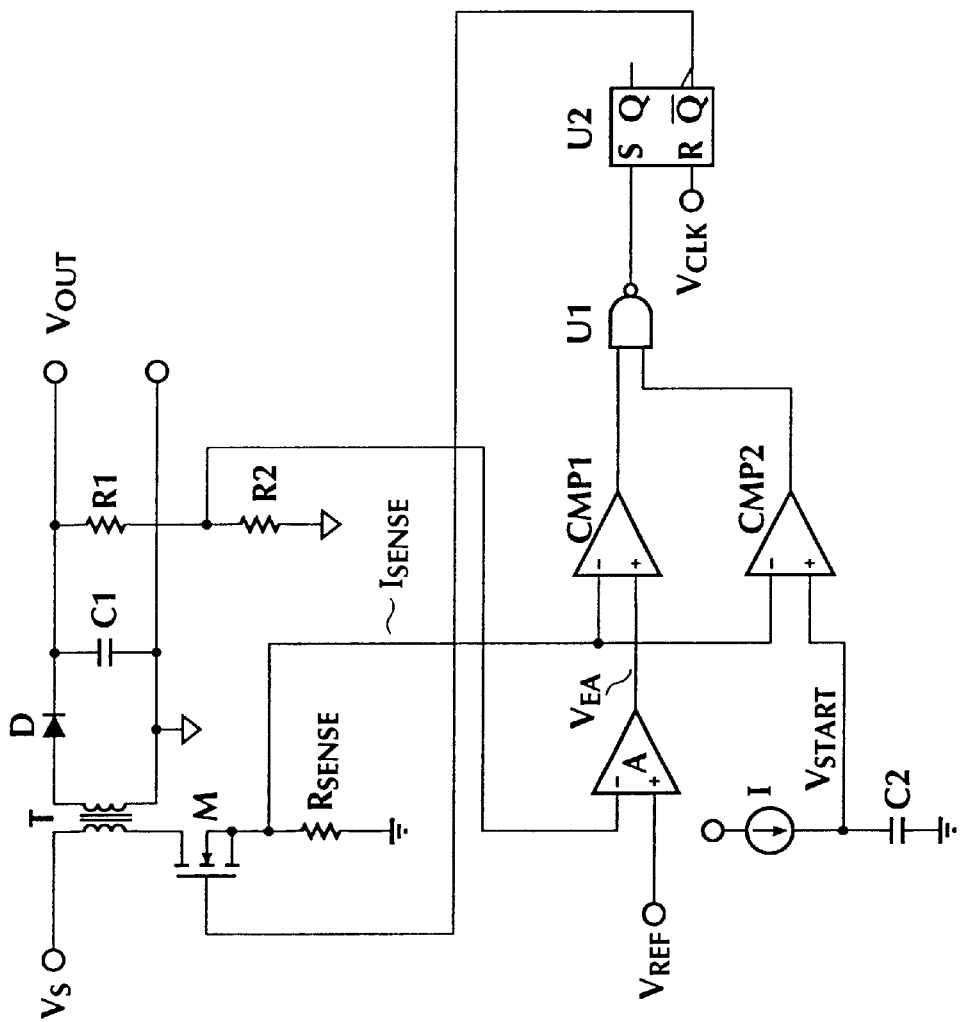
FIG. 1 illustrates a schematic block diagram of a conventional pulse width modulating (PWM) forward converter.
Figures 2A, 2B:
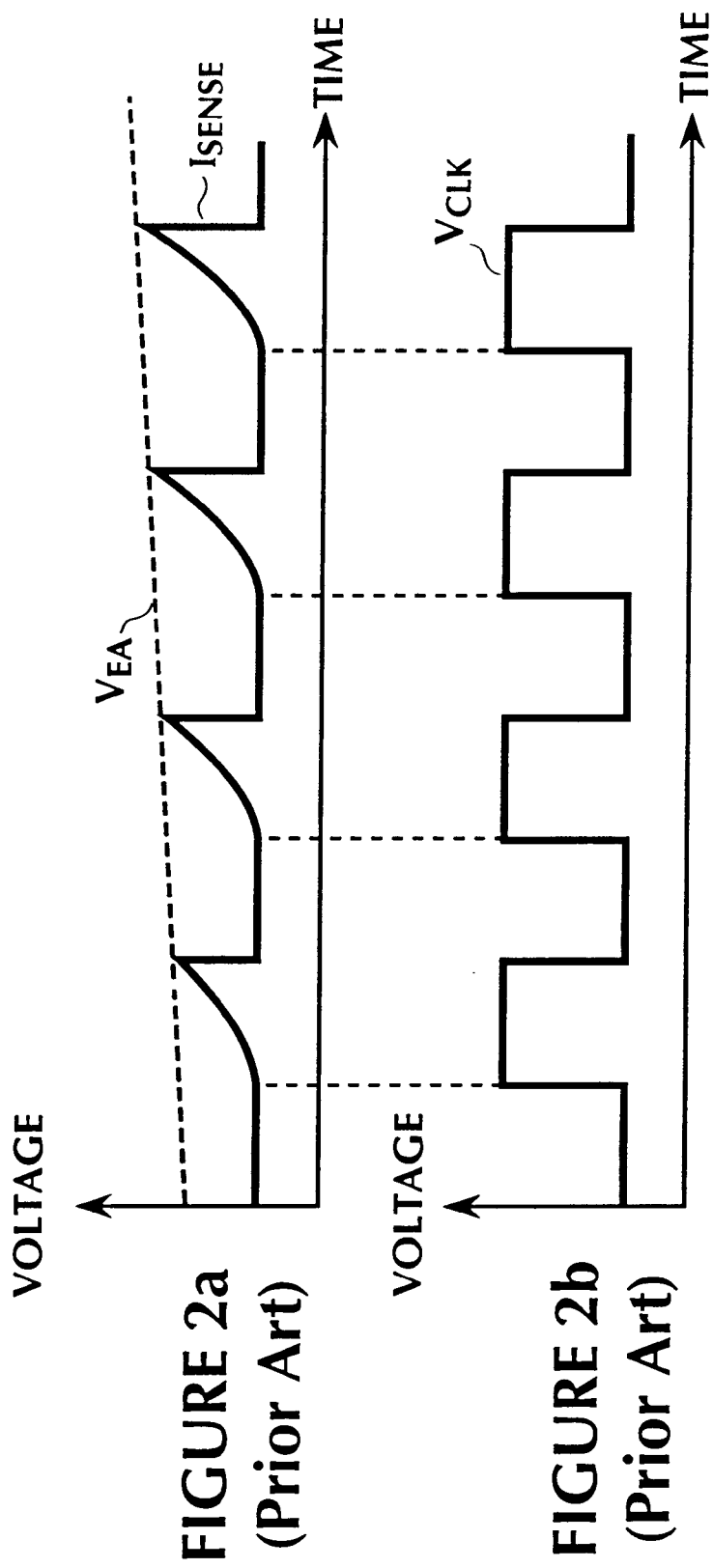
FIGS. 2a–b illustrate timing diagrams for signals of the PWM forward converter illustrated in FIG. 1
Figure 3:
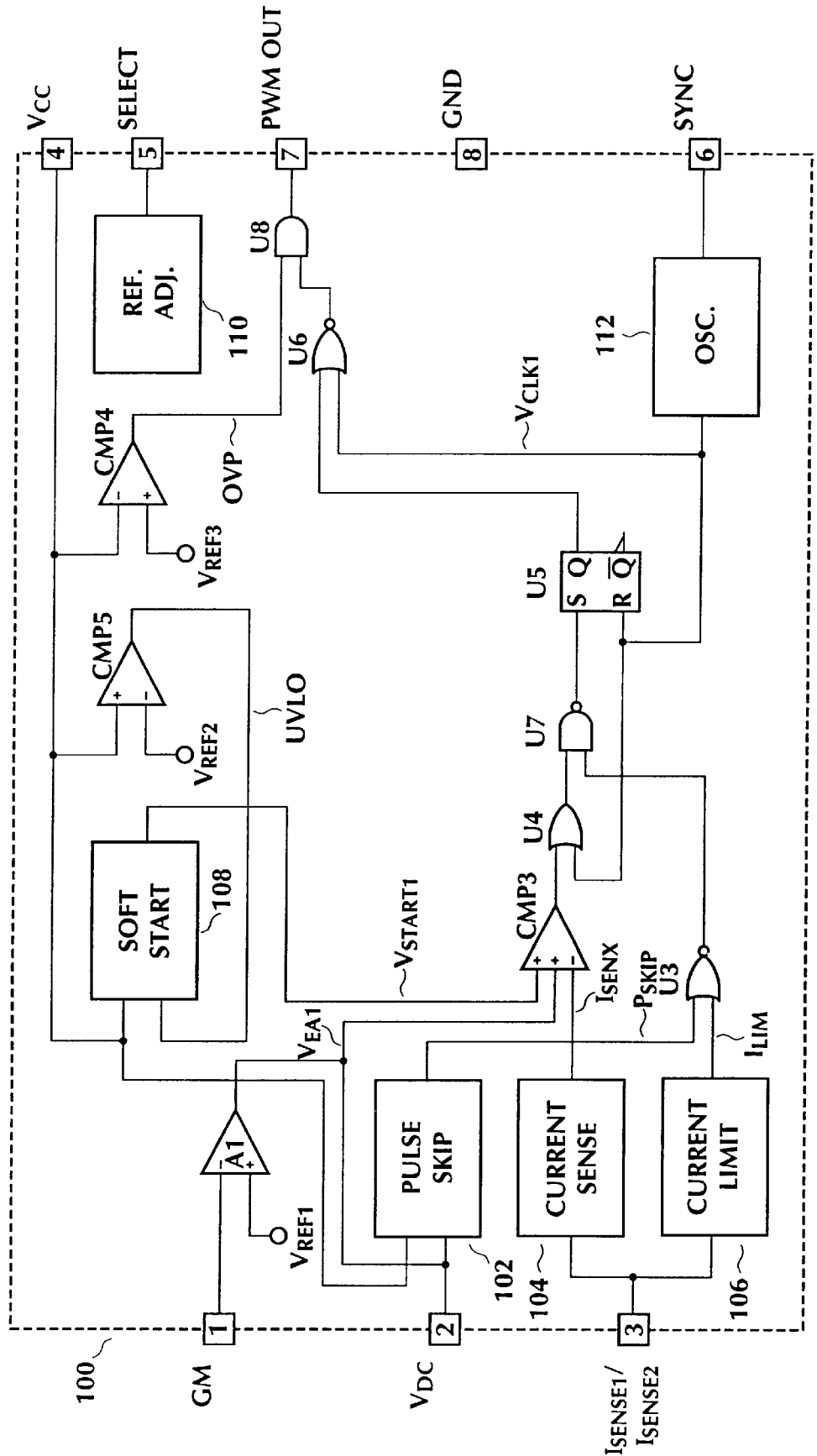
FIG. 3 illustrates a schematic block diagram of a universal integrated circuit controller for a PWM power converter in accordance with the present invention.

FIG. 3 illustrates a schematic block diagram of a universal controller 100 for a pulse width modulating (PWM) power converter in accordance with the present invention. In the preferred embodiment, the controller 100 is implemented as an integrated circuit which includes eight pins, numbered 1–8 in FIG. 3. Pin 1 receives a signal GM from circuit elements external to the controller 100 and is coupled to an inverting input of an error amplifier $A_1$. Preferably, the amplifier $A_1$ is a transconductance (gm) amplifier. A non-inverting input of the amplifier $A_1$ is coupled to a reference voltage $V_{REF1}$. An output of the amplifier $A_1$ forms an error signal $V_{EA1}$ and is coupled to a first non-inverting input of a three-input PWM comparator $CMP_3$, to Pin 2 and to a first input of a pulse skip circuit 102. Pin 2 receives a signal $V_{DC}$ from circuit elements external to the controller 100 when the controller 100 is utilized in a forward converter. However, Pin 2 is coupled to compensation elements when the controller 100 is utilized in a post-regulator, as explained in more detail herein. The signals $V_{EA1}$ and $V_{DC}$ can be present at the node coupled to the first non-inverting input of the comparator $CMP_3$. Only one of the signals $V_{EA1}$ or $V_{DC}$ actively controls a level of the voltage at this node at a time depending upon the particular application. An output of the pulse skip circuit 102 is coupled to a first input of a logic NOR gate $U_3$.

Pin 3 receives a voltage signal $I_{SENSE1}$ or a voltage signal $I_{SENSE2}$ from circuit elements external to the controller 100 and is coupled to an input of a current sense circuit 104 and to an input of a current limit circuit 106. An output of the current sense circuit 104 is a signal $I_{SENSEX}$ which is coupled to an inverting input of the comparator $CMP_3$. The signal $I_{SENX}$ applied to the inverting input of the comparator $CMP_3$ is representative of the signal $I_{SENSE1}$ or the signal $I_{SENSE2}$ which is applied to the input of the current sense circuit 104 though the polarity of the signal $I_{SENX}$ is preferably positive regardless of the polarity of the signal $I_{SENSE1}$ or $I_{SENSE2}$. An output of the current limit circuit 106 forms a signal $I_{LIM}$ and is coupled to a second input of the NOR gate $U_3$.

Pin 4 receives a supply voltage $V_{CC}$ from circuit elements external to the controller 100 and is coupled to a second input of the pulse skip circuit 102, to a first input of a soft-start circuit 108, to an inverting input of an hysteretic comparator $CMP_4$ and to a non-inverting input of an hysteretic comparator $CMP_5$. An inverting input of the comparator $CMP_5$ is coupled to a reference voltage $V_{REF2}$. An output of the comparator $CMP_5$ forms a signal UVLO and is coupled to a second input of the soft-start circuit 108. An output of the soft-start circuit 108 forms a signal $V_{START1}$ and is coupled to a second non-inverting input of the comparator $CMP_3$. An output of the comparator $CMP_3$ is coupled to a first input of a logic OR gate $U_4$.

Pin 5 is coupled to receive a signal SELECT from circuit elements external to the controller 100 and is coupled to an input of a reference adjust circuit 110. The reference adjust circuit 110 adjusts internal reference voltages for use by the controller 100 according to a logic level of the SELECT signal.

Pin 6 can be coupled to receive a signal SYNC from circuit elements external to the controller 100 and is coupled to an input of an oscillator 112. An output of the oscillator 112 forms a clock signal $V_{CLK1}$ and is coupled to a second input of the OR gate $U_4$, to a reset input R of a reset-dominant flip-flop $U_5$ and to a first input of a logic NOR gate $U_6$. A clock signal generated externally to the controller 100 can be coupled to Pin 6 of the controller 100. In which case, the clock signal $V_{CLK1}$ is synchronous with the externally generated clock signal. Otherwise, if an externally generated clock signal is not applied to Pin 6 of the controller 100, then the clock signal $V_{CLK1}$ is generated by the oscillator 112 as a "free running" signal (i.e. the clock signal $V_{CLK1}$ is not synchronous with any externally generated clock signal).

An output of the OR gate $U_4$ is coupled to a first input of a logic NAND gate $U_7$. An output of the NOR gate $U_3$ is coupled to a second input of the NAND gate $U_7$. An output of the NAND gate $U_7$ is coupled to a set input S of the flip-flop $U_5$. A Q output of the flip-flop $U_5$ is coupled to a second input of the NOR gate $U_6$. An output of the NOR gate $U_6$ is coupled to a first input of a logic AND gate $U_8$. An output of the comparator $CMP_4$ forms a signal OVP and is coupled to a second input of the AND gate $U_8$. An output of the AND gate $U_8$ is coupled to Pin 7 of the controller 100 and forms a switch control signal PWM OUT which is provided to circuit elements external to the controller 100.

Figure 4:
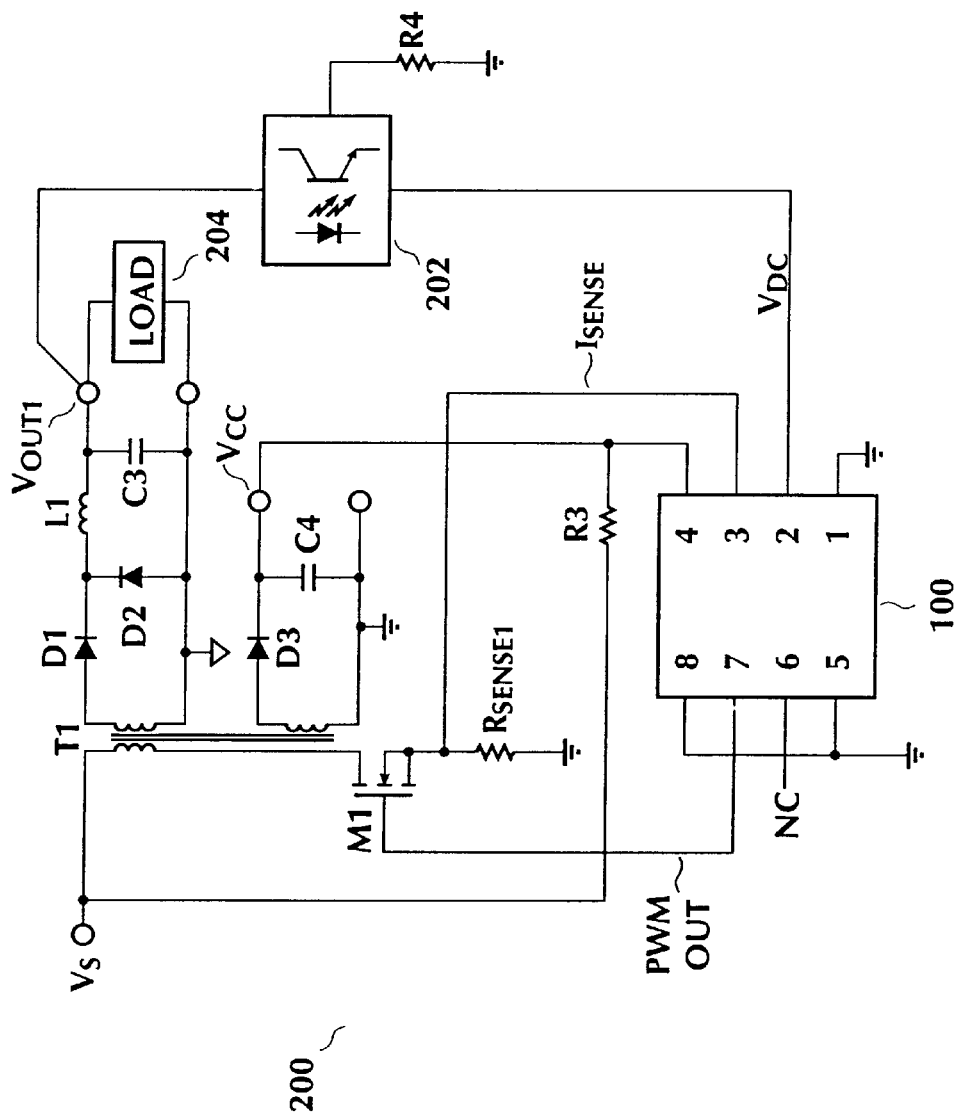
FIG. 4 illustrates a schematic diagram of a PWM forward converter which incorporates the integrated circuit controller illustrated in FIG. 3.

FIG. 4 illustrates a schematic diagram of a PWM forward converter 200 which incorporates the controller 100 illustrated in FIG. 3. A voltage source $V_S$ is coupled to a first terminal of a resistor $R_3$ and to a first terminal of a primary winding of a transformer To. A second terminal of the primary winding of the transformer $T_1$ is coupled to a drain of a MOS transistor $M_1$. Pin 7 of the controller is coupled to a gate of the transistor $M_1$. A source of the transistor $M_1$ is coupled to a first terminal of a sensing resistor $R_{SENSE1}$ and to Pin 3 of the integrated circuit controller 100. A second terminal of the resistor $R_{SENSE1}$ is coupled to a first ground node. The signal $I_{SENSE1}$ is formed at the first terminal of the resistor $R_{SENSE1}$ and is representative of a level of current passing through the primary winding of the transformer T. when the transistor $M_1$ is active (turned on). When the transistor $M_1$ is inactive (turned off), current flowing in the primary winding of the transformer $T_1$ can be returned to the supply $V_S$ through a diode (not shown for simplicity of illustration).

A first terminal of a secondary winding of the transformer $T_1$ is coupled to an anode of a diode $D_1$. A cathode of the diode $D_1$ is coupled to a cathode of a diode $D_2$ and to a first terminal of an inductor $L_1$. A second terminal of the inductor $L_1$ is coupled to a first terminal of a capacitor $C_3$, to a first output node, and to a first terminal of an optical isolator 202.

A second terminal of the secondary winding of the transformer $T_1$, an anode of the diode $D_2$ and a second terminal of the capacitor $C_3$ are coupled to a second ground node. An output voltage $V_{OUT1}$ is formed at the first output node. A load 204 can be coupled across the capacitor $C_3$.

A second terminal of the optical isolator 202 forms the signal $V_{DC}$ and is coupled to Pin 2 of the controller 100. The gm amplifier $A_1$ with its Pin 1 input tied to ground is utilized to supply a pull-up current for the optical isolator 202. A third terminal of the optical isolator 202 is coupled to a first terminal of a resistor $R_4$. A second terminal of the resistor $R_4$ is coupled to the first ground node. The signal $V_{DC}$ is an error signal which is representative of a difference between the output voltage $V_{OUT1}$ formed at the output node and a desired level for the output voltage $V_{OUT1}$. A value of the resistor $R_4$ sets the desired level of the output voltage $V_{OUT1}$. Because the optical isolator 202 forms the error signal $V_{DC}$, the signal $V_{DC}$ is applied to the first non-inverting input of the comparator $CMP_3$ (FIG. 3) and the amplifier $A_1$ (FIG. 3) is disabled from forming the error signal $V_{EA1}$. However, as mentioned above, the amplifier $A_1$ forms the pull-up current for the optical isolator 202. The optical isolator 202 optically isolates the first ground node from the second ground node. For example, the optical isolator 202 can include a TL431 optical isolator.

A first terminal of a second secondary winding of the transformer $T_1$ is coupled to an anode of a diode $D_3$. A cathode of the diode $D_3$ is coupled to a first terminal of a capacitor $C_4$, to a second output node, to Pin 4 of the controller 100 and to a second terminal of the resistor $R_3$. A supply voltage $V_{CC}$ for the integrated circuit controller 100 is formed at the second output node. A second terminal of the second secondary winding of the transformer $T_1$, a second terminal of the capacitor $C_4$, Pin 5 of the controller 100 and Pin 8 of the controller 100 are coupled to the first ground node.

FIGS. 5a–h illustrate timing diagrams for selected signals of the controller 100 and PWM forward converter 200 illustrated in FIGS. 3–4. More particularly, FIG. 5a illustrates the clock signal $V_{CLK1}$; FIG. 5b illustrates a signal at the Q output of the flip-flop $U_5$; FIG. 5c illustrates a signal at the output of the NOR gate $U_6$; FIG. 5d illustrates the switch control signal PWM OUT at Pin 7 of the controller 100; FIG. 5e illustrates a signal at the output of the OR gate $U_4$; FIG. 5f illustrates a signal at the output of the NAND gate $U_7$; FIG. 5g illustrates a signal at the output of the comparator $CMP_3$; and FIG. 5h illustrates the error signal $V_{DC}$ and sensing signal $I_{SENSE1}$.

Figure 5:
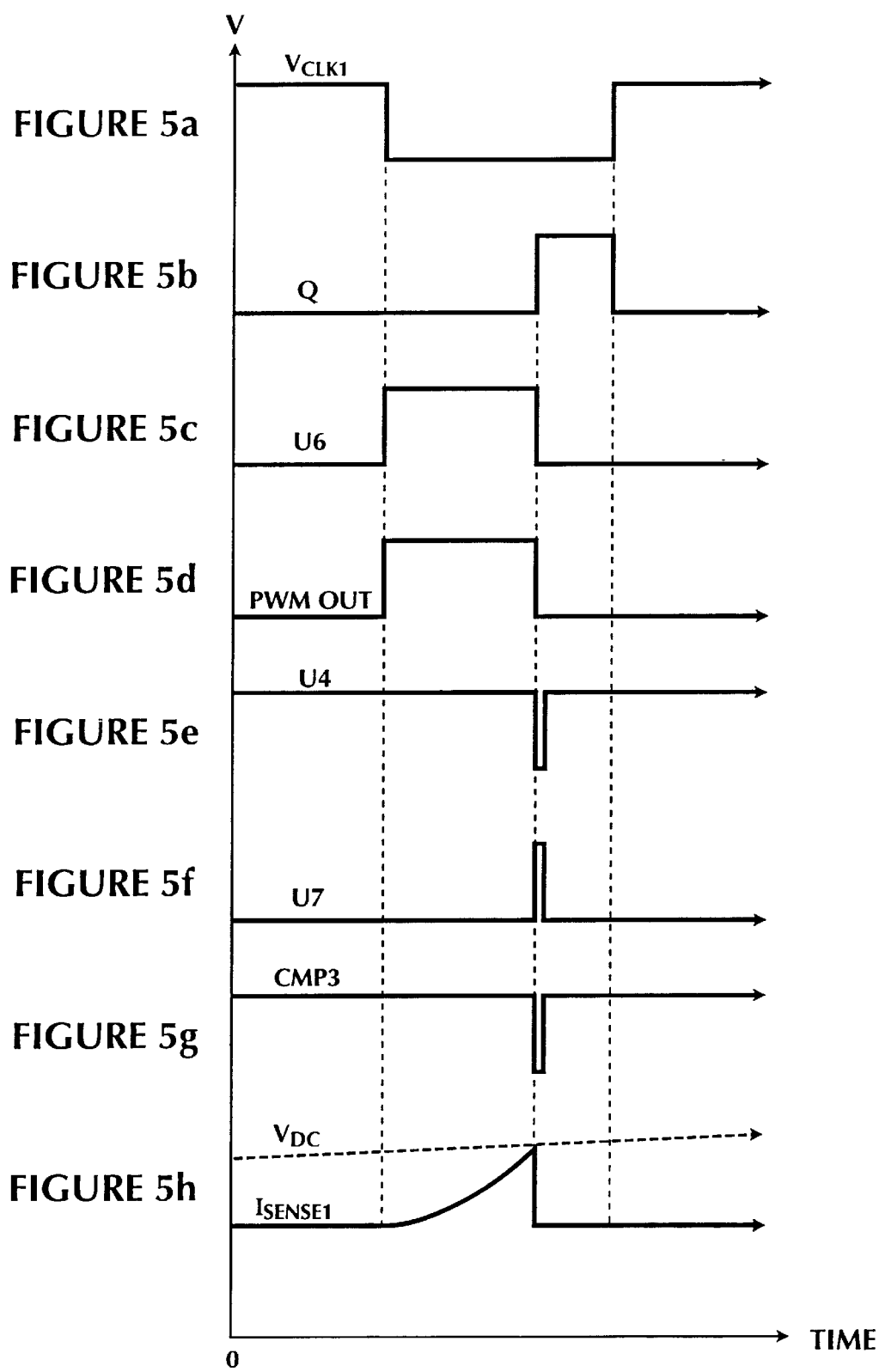
FIGS. 5a–h illustrate timing diagrams for selected signals of the controller and PWM forward converter illustrated in FIGS. 3–4.

Referring to FIGS. 3–5, upon the clock signal $V_{CLK1}$ transitioning to a logic high voltage, as shown at time zero in FIG. 5a, the flip-flop $U_5$ (FIG. 3) is placed in a reset condition and, thus, the Q output of the flip-flop $U_5$ is a logic low voltage, as shown in FIG. 5b. Because the flip-flop $U_5$ is reset dominant, the flip-flop $U_5$ remains in a reset condition while the signal $V_{CLK1}$ is a logic high voltage. In addition, the logic high voltage of the clock signal $V_{CLK1}$ is applied to the first input of the NOR gate $U_6$ (FIG. 3). Under these conditions, the output of the NOR gate $U_6$ is a logic low voltage, as shown in FIG. 5c. Accordingly, the signal PWM OUT is a logic low voltage, as shown in FIG. 5d, and the transistor $M_1$ (FIG. 4) is held off while the clock signal $V_{CLK1}$ is logic high voltage.

The logic high voltage of the clock signal $V_{CLK1}$ is also applied to the second input of the OR gate $U_4$ (FIG. 3). As a result, the output of the OR gate $U_4$ is a logic high voltage, as shown in FIG. 5e. Assuming the signals $P_{SKIP}$ and $I_{LIM}$ are both a logic low voltage, then the output of the OR gate $U_3$ (FIG. 3) is logic high voltage. As a result, the output of the NAND gate $U_7$ (FIG. 3) and the set input S of the flip-flop $U_5$ are a logic low voltage, as shown in FIG. 5f.

Because the transistor $M_1$ is held off while the clock signal $V_{CLK1}$ is a logic high voltage, the voltage signal $I_{SENSE1}$ is lower than the error signal $V_{DC}$, as shown in FIG. 5h. As a result, the output of the comparator $CMP_3$ (FIG. 3) is logic high voltage prior to the clock signal $V_{CLK1}$ transitioning to a logic low voltage, as shown in FIG. 5g.

Then, when the clock signal $V_{CLK1}$ transitions to a logic low voltage, as shown in FIG. 5a, the reset input of the flip-flop $U_5$ transitions to a logic low voltage. Thus, the flip-flop $U_5$ is no longer held in the reset condition. In addition, the logic high voltage of the output of the comparator $CMP_3$ results in the output of the OR gate $U_4$ remaining a logic high voltage upon the logic low voltage of the clock signal $V_{CLK1}$ being applied to the second input of the OR gate $U_4$, as shown in FIG. 5e. As a result, the output of the NAND gate $U_7$ and the set input S of the flip-flop $U_5$ remain a logic low voltage upon a transition in the clock signal $V_{CLK1}$ from high to low, as shown in FIG. 5f.

Because the set input S of the flip-flop $U_5$ is a logic low voltage, the Q output of the flip-flop $U_5$ remains a logic low voltage, as shown in FIG. 5b, and, thus, the second input of the NOR gate $U_6$ is also logic low voltage. In addition, the logic low voltage of the clock signal $V_{CLK1}$ is applied to the first input of the NOR gate $U_6$. In response, the output of the NOR gate $U_6$ transitions to a logic high voltage, as shown in FIG. 5c. Accordingly, the signal PWM OUT also transitions to a logic high voltage, as shown in FIG. 5d.

As a result, the transistor $M_1$ is turned on. As current flows through the transistor $M_1$, the signal $I_{SENSE1}$ begins to rise, as shown in FIG. 5h. Once the signal $I_{SENSE1}$ rises above the level of the error signal $V_{DC}$, then the output of the comparator $CMP_3$ transitions to a logic low voltage, as shown in FIG. 5g. As a result, the output of the OR gate $U_4$ transitions to a logic low voltage, as shown in FIG. 5e. Because the output of the OR gate $U_4$ is a logic low voltage, the output of the NAND gate $U_7$ transitions from a logic low voltage to a logic high voltage, as shown in FIG. 5f. This sets the flip-flop $U_7$, such that the Q output transitions to a logic high voltage, as shown in FIG. 5b. As a result, the output of the NOR gate $U_6$ and, thus, the signal PWM OUT become a logic low voltage, as shown in FIGS. 5c–d. This turns the transistor $M_1$ off. This process repeats for each cycle of the clock signal $V_{CLK1}$, thereby regulating the output voltage $V_{OUT1}$.

The above-described regulation of the output voltage $V_{OUT1}$ can be altered or interrupted under certain conditions. For example, in the event of a fault condition which results in an excessive level for the output voltage supply $V_{CC}$ (an overvoltage condition), the signal OVP transitions from a logic high voltage to a logic low voltage. In response, the AND gate $U_8$ holds the transistor $M_1$ off, thereby disabling switching of the transistor $M_1$.

Figure 6:
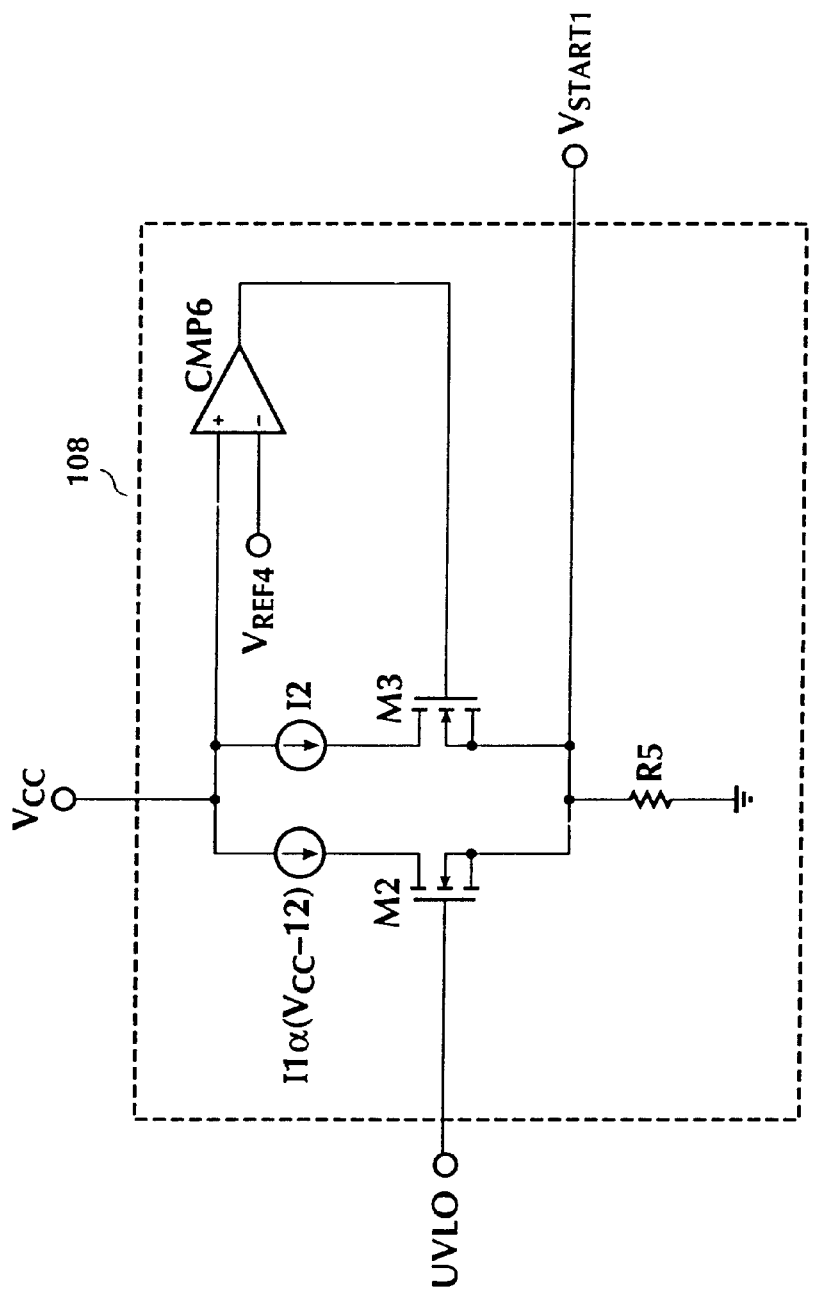
FIG. 6 illustrates a schematic block diagram of the soft-start circuit illustrated in FIG. 3.

In addition, under start-up conditions, the soft-start circuit 108 and the comparator $CMP_3$ illustrated in FIG. 3 alter operation of the controller 100. FIG. 6 illustrates a schematic block diagram of the soft-start circuit 108. The supply voltage $V_{CC}$ is coupled to a non-inverting input of a comparator $CMP_6$, to a first terminal of a current source $I_1$ and to a first terminal of a current source I2. An inverting input of the comparator $CMP_6$ is coupled to a reference voltage $V_{REF4}$. A second terminal of the current source $I_1$ is coupled to a drain of a MOS transistor $M_2$. A gate of the transistor $M_2$ is coupled to receive the signal UVLO from the comparator $CMP_5$ (FIG. 3). A second terminal of the current source $I_2$ is coupled to a drain of a MOS transistor $M_3$. An output of the comparator $CMP_6$ is coupled to a gate of the transistor $M_3$. A source of the transistor $M_2$ and a source of the transistor $M_3$ are coupled to a first terminal of a resistor $R_5$. A second terminal of the resistor $R_5$ is coupled to the first ground node. The signal $V_{START1}$ is formed across the resistor $R_5$.

Figure 7A:
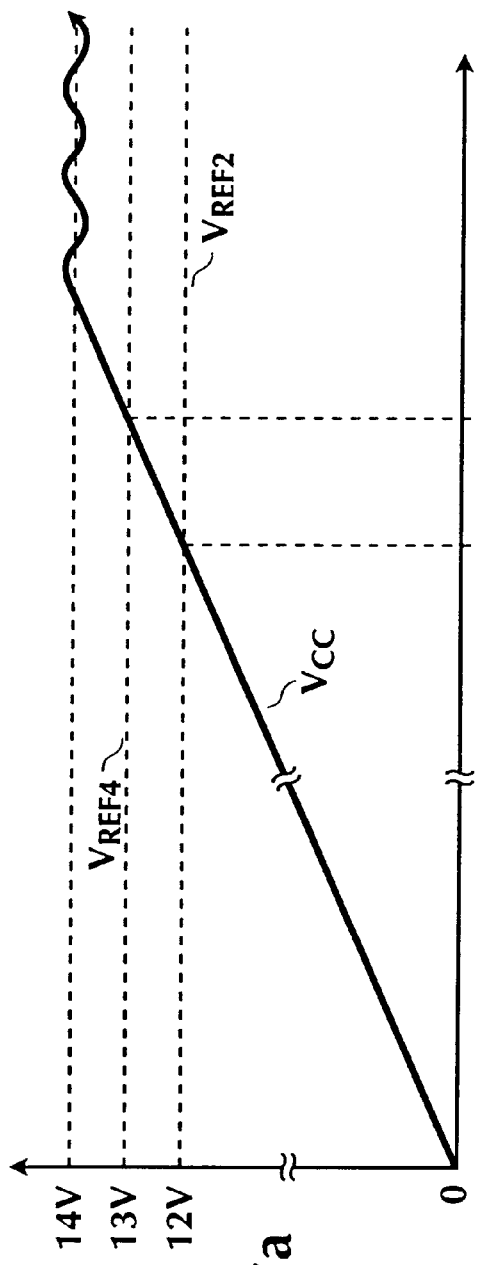
FIGS. 7a–b illustrate a timing diagrams for selected signals of the soft-start circuit illustrated in FIGS. 3 and 6.
Figure 7B:
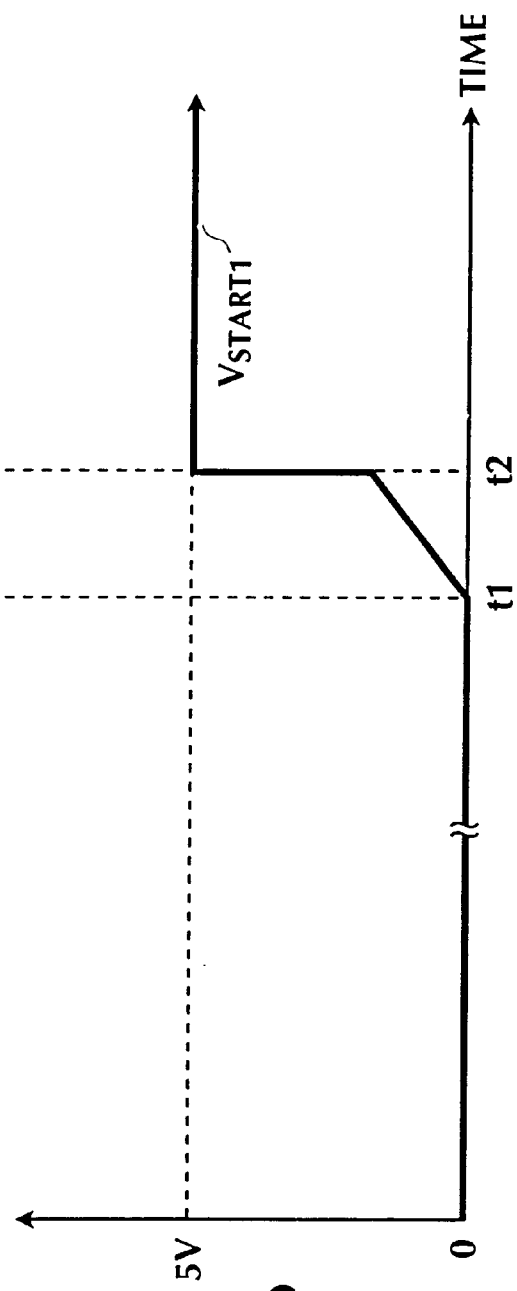

FIGS. 7a–b illustrate a timing diagrams for selected signals of the soft-start circuit 108 illustrated in FIGS. 3 and 6. More particularly, FIG. 7a illustrates a timing diagram for the supply voltage $V_{CC}$, while FIG. 7b illustrates a timing diagram for the signal $V_{START1}$. Upon start-up, the supply voltage $V_{CC}$ is zero or nearly zero. The supply voltage $V_S$ is applied to the forward converter 200 (FIG. 4). In response, the supply voltage $V_{CC}$ gradually ramps up, as shown in FIG. 7a, due to the capacitor $C_4$ (FIG. 4) charging through the bleed resistor $R_3$ (FIG. 4). As $V_{CC}$ rises to a level sufficient to allow circuits of the controller 100 (FIG. 3) to begin operating, the output of the comparator $CMP_5$ (FIG. 3) holds the transistor $M_2$ (FIG. 6) off while the comparator $CMP_6$ (FIG. 6) holds the transistor $M_3$ (FIG. 6) off. In the preferred embodiment, $V_{REF2}$ (FIG. 3) is 12 volts, while $V_{REF4}$ (FIG. 6) is 13 volts. While $V_{CC}$ is below $V_{REF2}$, the signal $V_{START1}$ is zero volts (any residual charge is discharged to the first ground node through the resistor $R_5$ (FIG. 6)). This is shown in FIG. 7b where the signal $V_{START1}$ is substantially at ground level prior to the time $t_1$ where $V_{CC}$ reaches $V_{REF2}$ (e.g., 12 volts).

Figure 9:
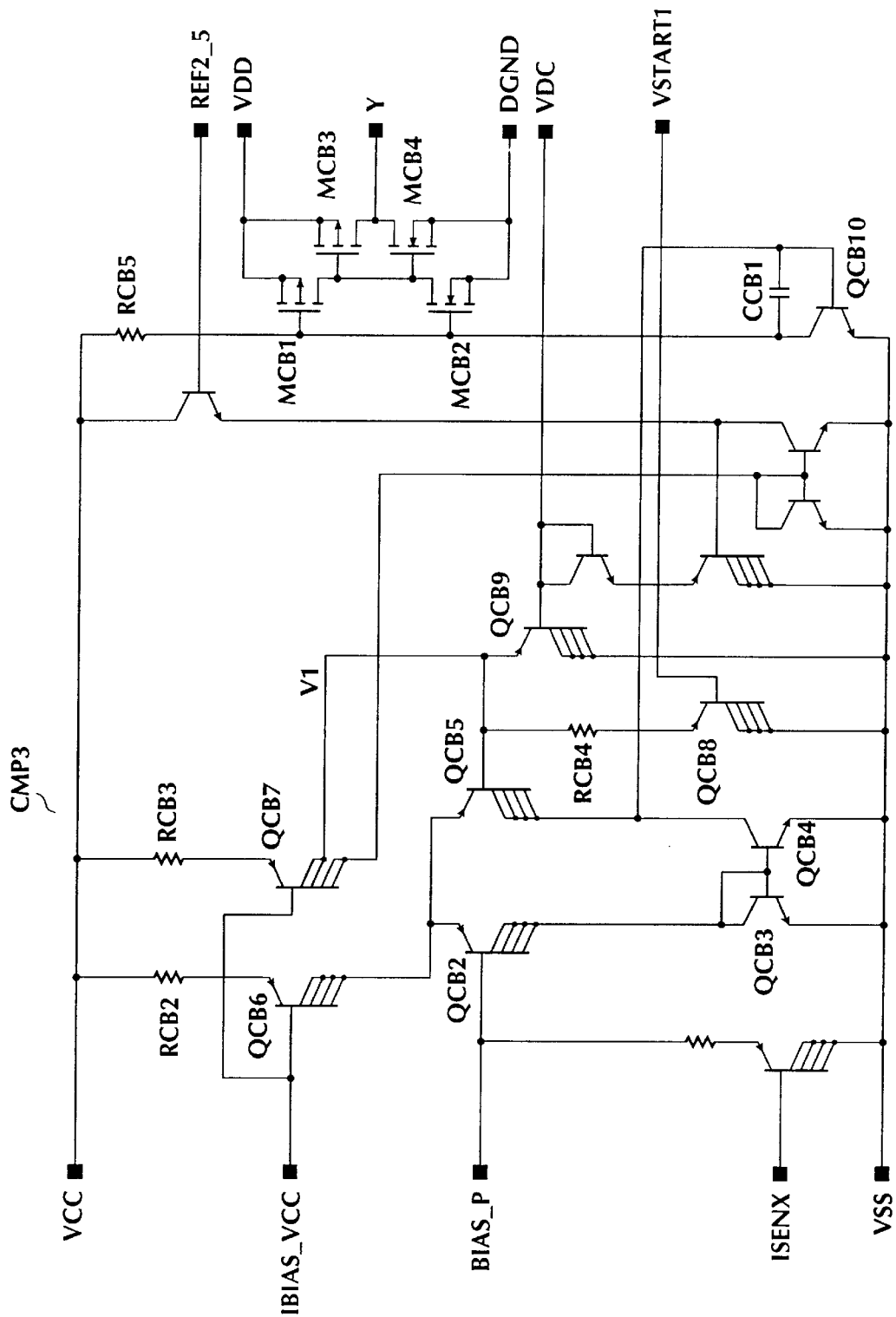
FIG. 9 illustrates a schematic diagram of the PWM comparator illustrated in FIG. 3.

The PWM comparator $CMP_3$ (FIG. 3) compares the smaller of the signal $V_{DC}$ (or $V_{EA1}$) and the signal $V_{START1}$ to the signal $I_{SENX}$ for controlling the duty cycle of the transistor $M_1$ (FIG. 4). FIG. 9 illustrates a schematic diagram of the PWM comparator $CMP_3$ illustrated in FIG. 3. Referring to FIGS. 3–4, upon start-up, the output voltage $V_{OUT1}$ is zero or nearly zero. As such, the error signal $V_{DC}$ (or $V_{EA1}$) is relatively large, whereas, the signal $V_{START1}$ is substantially zero, as explained above. Accordingly, the output of the comparator $CMP_3$ prevents the transistor $M_1$ from turning on.

Eventually, the supply $V_{CC}$ reaches a level above $V_{REF2}$ (e.g., 12 volts). This is shown occurring at the time $t_1$ in FIG. 7a. In response, the output of the comparator $CMP_5$ (FIG. 3) transitions from a logic low voltage to a logic high voltage and the transistor $M_2$ (FIG. 6) is turned on. As a result, the current source $I_1$ (FIG. 6) generates a current which forms the voltage signal $V_{START1}$ across the resistor $R_5$ (FIG. 6). The current generated by the current source $I_1$ is representative of the level of the supply $V_{CC}$. In the preferred embodiment, the current generated by the current source $I_1$ is substantially proportional to the level of the supply $V_{CC}$ once the supply voltage reaches the level of the reference voltage $V_{REF2}$. Thus, the current $I_1$ can be given as: $I_1 = K_1 * (V_{CC} - V_{REF2})$, where $K_1$ is a constant. After $V_{CC}$ surpasses the level of $V_{REF2}$, then the signal $V_{START1}$ increases as $V_{CC}$ increases. This is shown in FIG. 7b by the signal $V_{START1}$ gradually rising after the time $t_1$, as does the supply voltage $V_{CC}$ in FIG. 7a.

After the time $t_1$, the output of the comparator $CMP_3$, no longer prevents the transistor $M_1$ (FIG. 4) from turning on. Rather, the signal $V_{START1}$ is compared to the signal $I_{SENX}$ by the comparator $CMP_3$ so as to allow the transistor $M_1$ to turn on for a portion of each cycle of the clock signal $V_{CLK1}$. In response, $V_{CC}$ increases further and the output voltage $V_{OUT1}$ (FIG. 4) starts to increase. As the level of the supply $V_{CC}$ continues to gradually increase, so does the level of the signal $V_{START1}$. Accordingly, the duty cycle of the transistor $M_1$ gradually increases after the time $t_1$. In response, the output voltage $V_{OUT1}$ ramps up while the error signal $V_{DC}$ (or $V_{EA1}$) begins to fall.

Eventually, the error signal $V_{DC}$ (or $V_{EA1}$) can fall to a level below that of the signal $V_{START1}$, at which point, the soft-start circuit 108 no longer affects operation of the forward converter 200. In the preferred embodiment, however, once the supply voltage $V_{CC}$ rises to a level of $V_{REF4}$ (e.g., 13 volts), the output of the comparator $CMP_6$ (FIG. 6) transitions from a logic low voltage to a logic high voltage. As a result, the transistor $M_3$ (FIG. 6) turns on. In response, the current source $I_2$ (FIG. 6) generates a current which serves to rapidly increase the signal $V_{START1}$ to a level which is above the range of possible levels for the error signal $V_{DC}$ (or $V_{EA1}$). This is shown in FIG. 7a where the supply voltage $V_{CC}$ exceeds $V_{REF4}$ (e.g., 13 volts) at the time $t_2$ and, at the same time, the signal $V_{START1}$ rapidly increases, as shown in FIG. 7b. Preferably, the signal $V_{START1}$ is rapidly increased to a level of 5 volts because, in the preferred embodiment, the error signal $V_{DC}$ and $V_{EA1}$ are constrained between zero and five volts. Because $V_{START1}$ is raised to a level higher than the error signal $V_{DC}$, the duty cycle of the transistor $M_1$ is no longer affected by the soft-start circuit 108 (FIG. 3) and the forward converter 200 operates to regulate the output voltage $V_{OUT1}$ at the desired level, as described above in reference to FIGS. 3–5.

In an alternate embodiment, the current source $I_2$ (FIG. 6) is omitted and, instead, the drain of the transistor $M_3$ is coupled to the supply $V_{CC}$ or to an appropriate reference voltage. When the transistor $M_3$ is activated by the signal from the comparator $CMP_6$ (FIG. 6), the signal $V_{START1}$ is rapidly increased to the level of the supply $V_{CC}$ or to the level of the appropriate reference voltage. In response, the comparator $CMP_3$ compares the signal $I_{SENSE1}$ to the error signal $V_{DC}$ (or $V_{EA1}$) rather than to the signal $V_{START1}$.

During operation, the supply voltage $V_{CC}$ is preferably maintained at a level of approximately 14 volts, as shown in FIG. 7a. The comparator $CMP_6$ (FIG. 6) preferably exhibits a hysteretic characteristic so as to prevent the soft-start circuit 108 from affecting the duty cycle of the transistor $M_1$ in the event that the supply voltage $V_{CC}$ drops. Rather, the soft-start circuit 108 is preferably activated only upon start-up. If the supply voltage $V_{CC}$ falls below a predetermined low level (e.g., 8 volts), then this indicates an error condition and the controller 100 is preferably shut down until it is reset.

A feature of the soft start circuit 108 is that the current source $I_2$ generates a current which is related to the supply voltage $V_{CC}$, rather than generating a constant current. This enables the signal $V_{START1}$, formed across the resistor $R_5$ (FIG. 6), to increase gradually and reliably although an external capacitor is not required for forming the signal $V_{START1}$. This advantageously reduces the number pins required when the controller 100 as implemented as an integrated circuit. As shown in FIGS. 3–4, such an integrated circuit can be implemented having eight pins and no capacitor, external or otherwise, is required for forming the signal $V_{START1}$.

Figure 8:
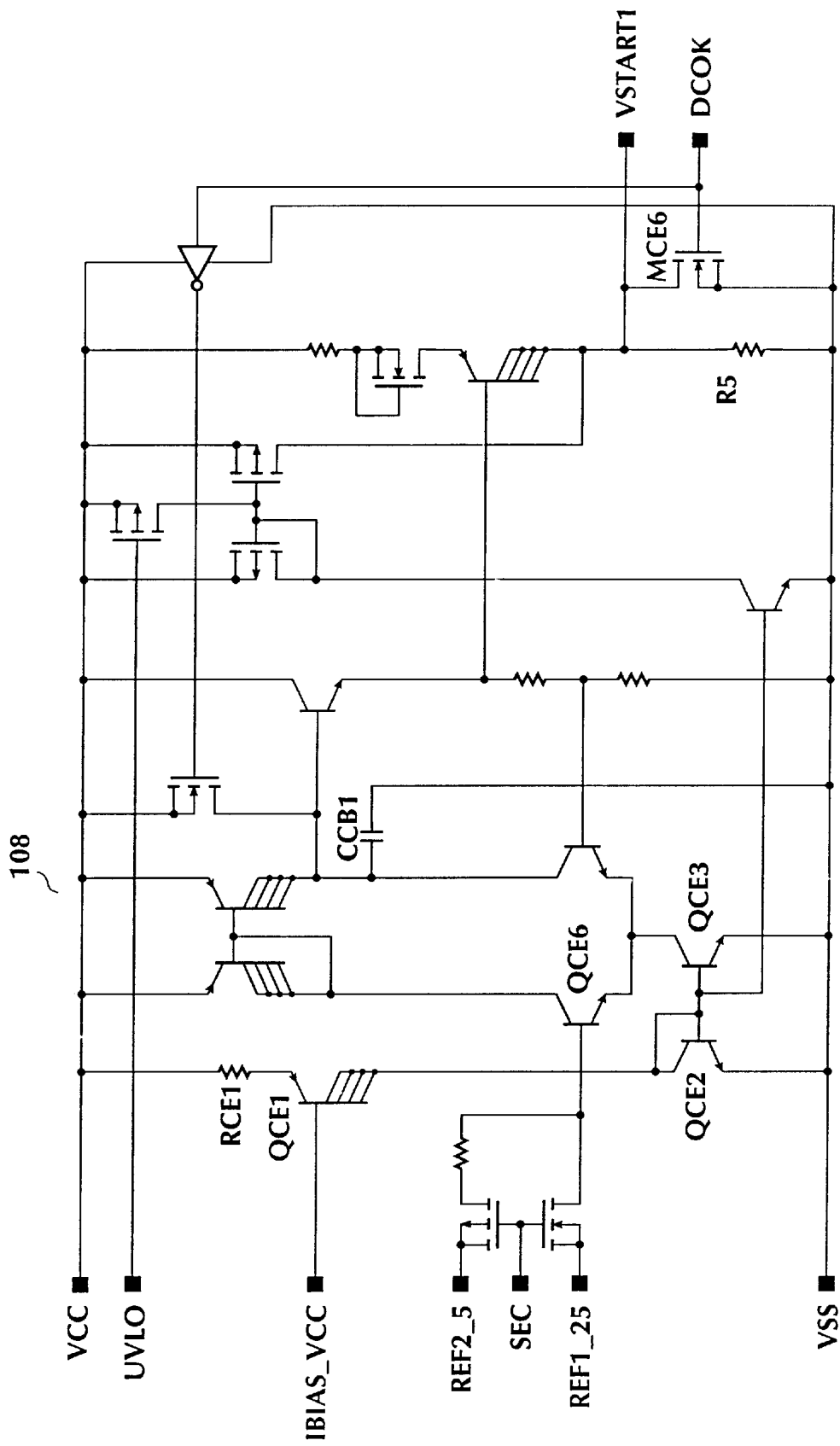
FIG. 8 illustrates a more detailed schematic diagram of the soft-start circuit illustrated in FIGS. 3 and 6.

FIG. 8 illustrates a more detailed schematic diagram of the soft-start circuit illustrated in FIGS. 3 and 6. The signal DCOK remains a logic high voltage until internal reference voltages of the controller 100 (FIG. 3) reach their operating levels and, then, transitions to a logic low voltage.

During operation of the forward converter 200 (FIG. 4) it is possible for the load 204 which receives the output voltage $V_{OUT1}$ to draw a low level of current. In which case, the output voltage $V_{OUT1}$ tends increase due to the transistor $M_1$ being switched on and off for each cycle of the clock signal $V_{CLK1}$. In the preferred embodiment, the pulse skip circuit 102 (FIG. 3) disables switching of the transistor $M_1$ under certain light load conditions. The pulse skip circuit 102 preferably disables switching of the transistor $M_1$ by changing its output signal $P_{SKIP}$ from a logic low voltage to a logic high voltage. In response, the output of the NOR gate $U_3$ (FIG. 3) changes from a logic high voltage to a logic low voltage. As a result, the output of the NOR gate $U_6$ (FIG. 3) and, thus, the signal PWM OUT, remain a logic low voltage, so long as the signal $P_{SKIP}$ is a logic high voltage, regardless of a level of the output of the comparator $CMP_3$ (FIG. 3).

Figure 10:
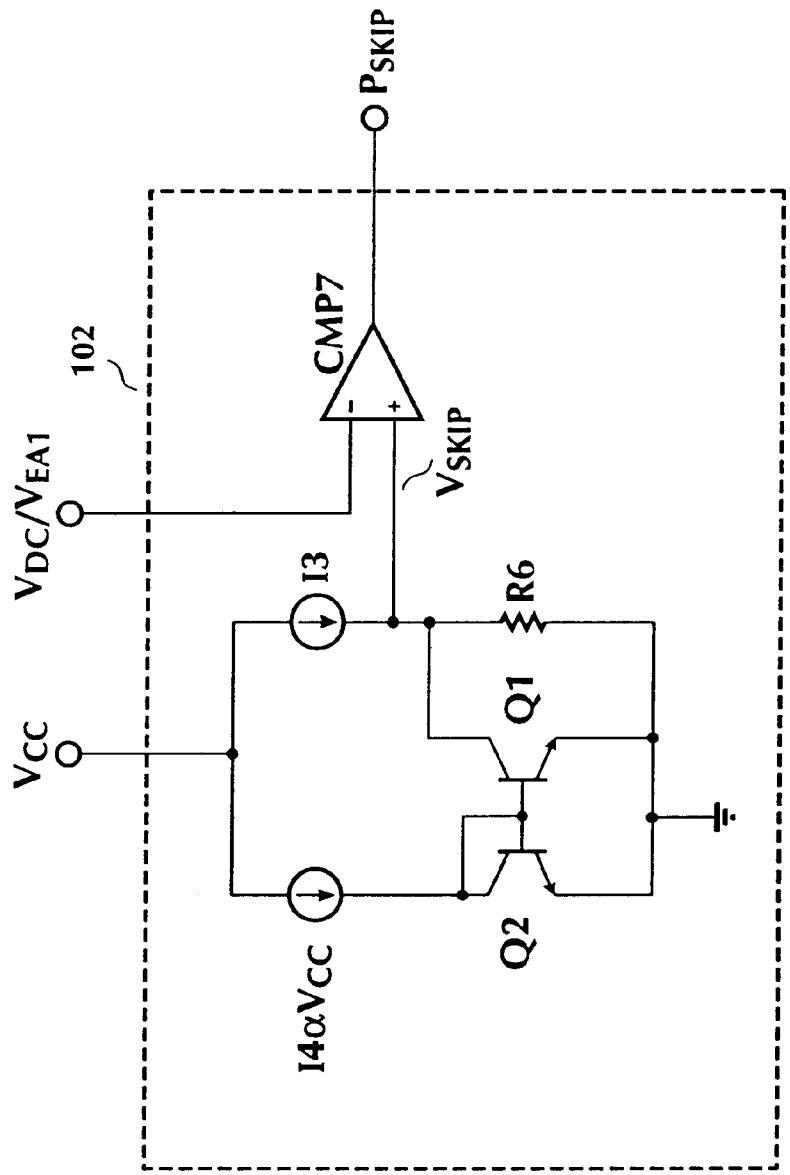
FIG. 10 illustrates a schematic block diagram of the pulse skip circuit illustrated in FIG. 3.

FIG. 10 illustrates a schematic block diagram of the pulse skip circuit 102 illustrated in FIG. 3. A first terminal of a current source $I_3$ and a first terminal of a current source $I_4$ are coupled to receive the supply voltage $V_{CC}$. A second terminal of the current source $I_3$ is coupled to a non-inverting input of a comparator $CMP_7$, to a first terminal of a resistor $R_6$, and to a collector of bipolar transistor $Q_1$. A second terminal of the current source $I_4$ is coupled to a collector of a bipolar transistor $Q_2$, to a base of the transistor $Q_2$ and to a base of the transistor $Q_1$. An emitter of the transistor $Q_1$, an emitter of the transistor $Q_2$ and a second terminal of the resistor $R_6$ are coupled to the first ground node. The error signal $V_{DC}$ (or $V_{EA1}$) is coupled to an inverting input of the comparator $CMP_7$. An output of the comparator $CMP_7$ forms the signal $P_{SKIP}$.

In the preferred embodiment, the current source $I_3$ generates a constant current while the current source $I_4$ generates a current which is related to the level of the supply $V_{CC}$. The transistors $Q_1$ and $Q_2$ form a current mirror such that a current flowing through the transistor $Q_1$ is equal to the current generated by the current source $I_4$. Thus, a pulse skip reference voltage signal $V_{SKIP}$ formed across the resistor $R_6$ is inversely related to the level of the supply $V_{CC}$. In the preferred embodiment, the voltage signal $V_{SKIP}$ varies substantially in reverse proportion to the level of the supply $V_{CC}$. Accordingly, the voltage signal $V_{SKIP}$ can be given as $V_{SKIP}=K_2-(K_3 * V_{CC})$, where $K_2$ and $K_3$ are constants.

When the load 204 (FIG. 4) draws a sufficient level of current that the output voltage $V_{OUT1}$ is regulated within a predetermined range, the output $P_{SKIP}$ of the comparator $CMP_7$ is logic low voltage. This is because the level of the error signal $V_{DC}$ (or $V_{EA1}$) is higher than the signal $V_{SKIP}$. However, when the output voltage $V_{OUT1}$ rises, as tends to occur when the load 204 draws a low level of current, the error signal $V_{DC}$ (or $V_{EA1}$) decreases. Assuming the level of the error signal $V_{DC}$ (or $V_{EA1}$) falls below the level of the signal $V_{SKIP}$, then the transistor switch $M_1$ (FIG. 4) will be held off by the signal $P_{SKIP}$ changing to a logic high voltage until the error signal $V_{DC}$ (or $V_{EA1}$) rises again to level sufficient to cause the output of the comparator $CMP_7$ to return the signal $P_{SKIP}$ to a logic low voltage. Note that when the transistor switch $M_1$ is disabled, then the error signal $V_{DC}$ (or $V_{EA1}$) will tend to rise since no power is delivered to the load 204 when the transistor $M_1$ is disabled from switching.

When the level of the voltage source $V_S$ increases, more energy is transferred by the transformer $T_1$ (FIG. 4) for each cycle of the transistor $M_1$ (FIG. 4) than when the voltage source $V_S$ is at a lower level. It is expected that when the level of the voltage source $V_S$ increases, the supply voltage $V_{CC}$ also increases. Because the pulse skip reference voltage signal $V_{SKIP}$ is preferably inversely related to the supply voltage $V_{CC}$, when the supply voltage $V_{CC}$ is at a higher level, the output voltage $V_{OUT1}$ must rise to a higher level before the signal $P_{SKIP}$ is asserted in comparison to when the supply voltage $V_{CC}$ is at a lower level. Forming the signal $V_{SKIP}$ such that it is inversely related to the supply voltage $V_{CC}$ tends to aid in spreading out the pulses in the control signal PWM OUT under light load conditions. This tends to conserve supply power and produces less noise than if periodic bursts of several pulses appeared the switch control signal PWM OUT. In addition, the levels of the current sources $I_3$, $I_4$ and the value of the resistor $R_6$ are preferably selected so as to aid in evenly spreading out in time to the extent practical the individual pulses which appear in the switch control signal PWM OUT.

Figure 11:
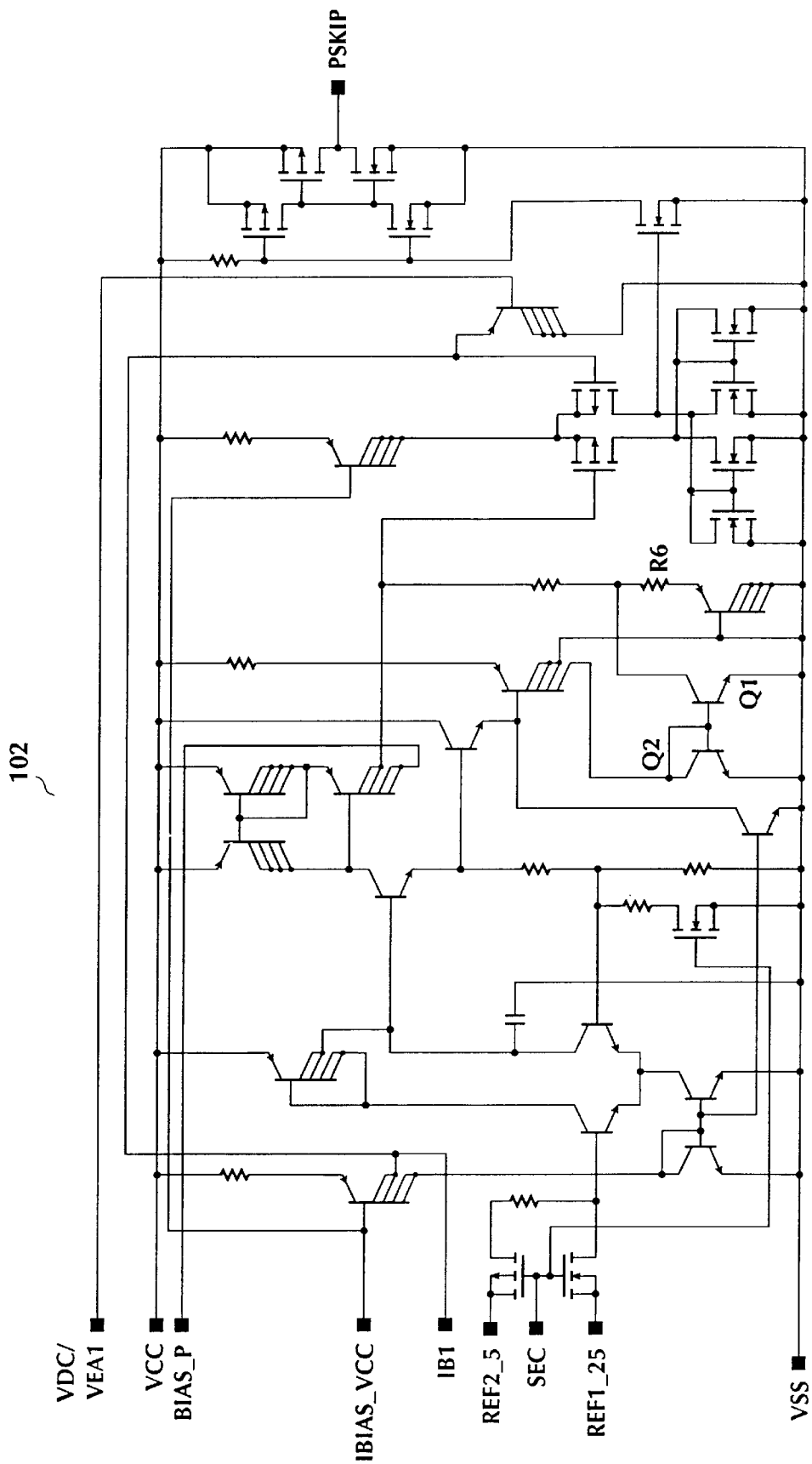
FIG. 11 illustrates a more detailed schematic diagram of the pulse skip circuit illustrated in FIGS. 3 and 10.

FIG. 11 illustrates a more detailed schematic diagram of the pulse skip circuit illustrated in FIGS. 3 and 10.

Figure 12:
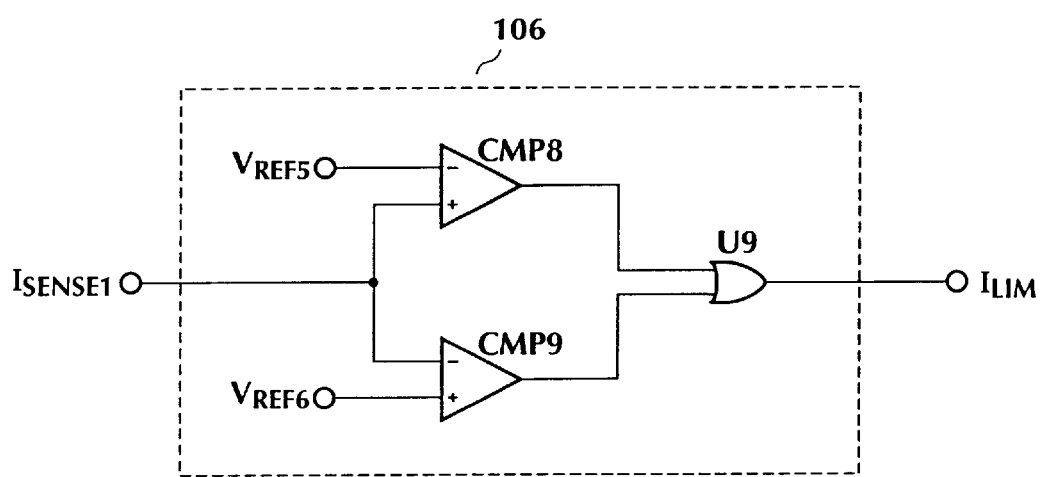
FIG. 12 illustrates a block schematic diagram of the current limit circuit illustrated in FIG. 3.

FIG. 12 illustrates a block schematic diagram of the current limit circuit 106 illustrated in FIG. 3. The signal $I_{SENSE1}$ (FIG. 3) is coupled to a non-inverting input of a comparator $CMP_8$ and to an inverting input of a comparator $CMP_9$. An inverting input of the comparator $CMP_8$ is coupled to a reference voltage $V_{REF5}$. A non-inverting input of the comparator $CMP_9$ is coupled to a reference voltage $V_{REF6}$. An output of the comparator $CMP_8$ is coupled to a first input of a logic OR gate $U_9$. An output of the comparator $CMP_9$ is coupled to a second input of the OR gate $U_9$. An output of the OR gate $U_9$ forms the signal $I_{LIM}$ (FIG. 3).

In the preferred embodiment, the reference voltage $V_{REF5}$ is positive (e.g., 1.5 volts), and the reference voltage $V_{REF6}$ is negative (e.g., −100 mV). Thus, when the signal $I_{SENSE1}$ is within the range of −100 mV to 1.5 volts, then the signal $I_{LIM}$ is a logic low voltage. As a result, the transistor $M_1$ (FIG. 4) is turned on and off, as explained above, to control the output voltage $V_{OUT1}$. However, when the signal $I_{SENSE1}$ is outside the range of −100 mV to 1.5 volts. this indicates an over-current condition. In response, the signal $I_{LIM}$ transitions from a logic low voltage to a logic high voltage. This opens (turns off) the transistor $M_1$ such that its duty cycle falls to zero. The transistor $M_1$ is disabled so long as the over-current condition persists.

Figure 13:
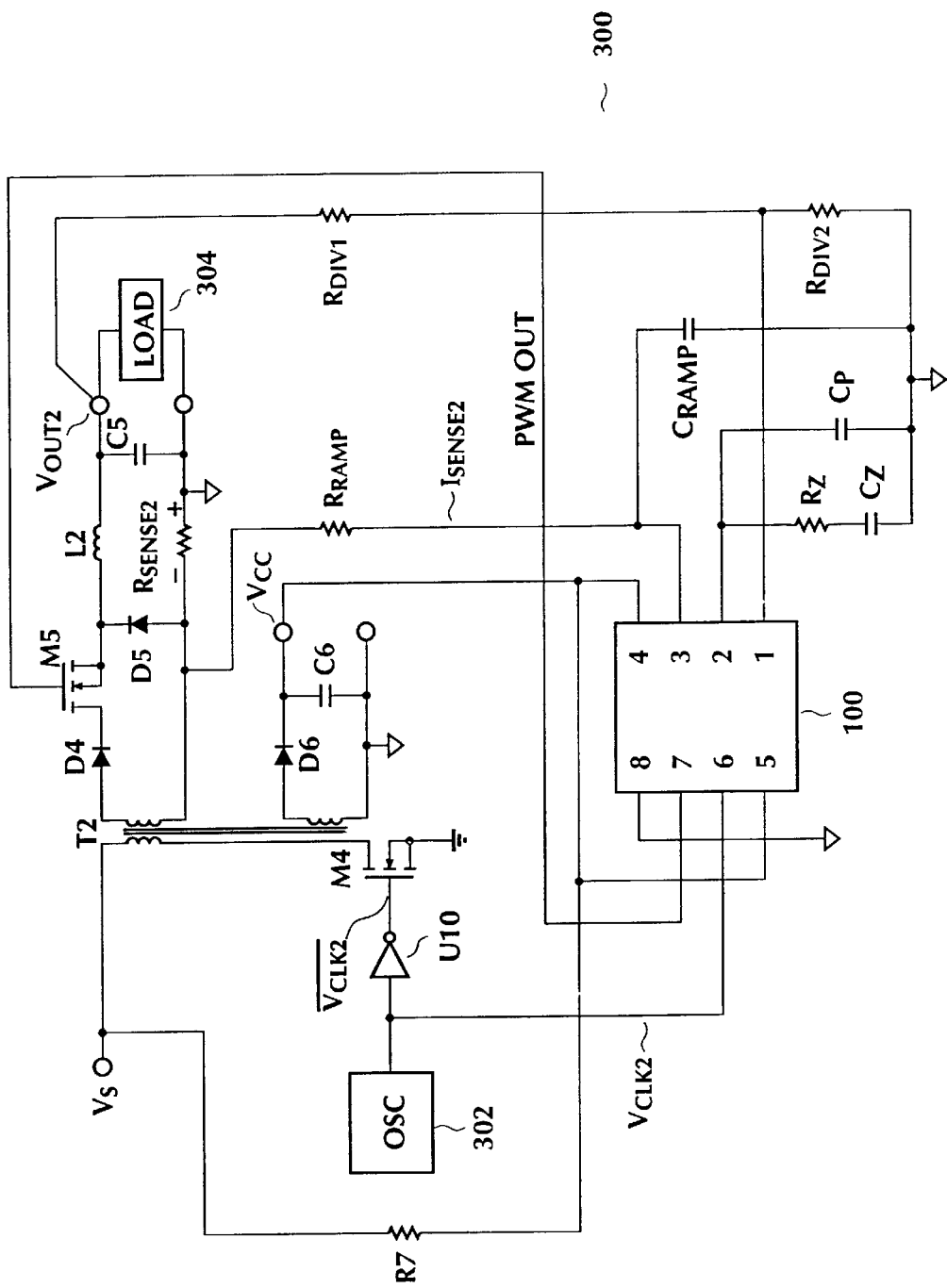
FIG. 13 illustrates a schematic diagram of a PWM post regulator which incorporates the integrated circuit controller illustrated in FIG. 3.

FIG. 13 illustrates a schematic diagram of a PWM post regulator 300 which incorporates the integrated circuit controller 100 illustrated in FIG. 3. A voltage source $V_S$ is coupled to a first terminal of a resistor $R_7$ and to a first terminal of a primary winding of a transformer $T_2$. A second terminal of the primary winding of the transformer $T_2$ is coupled to a drain of an MOS transistor $M_4$. A source of the transistor $M_4$ is coupled to a first ground node. An output $V_{CLK2}$ of an oscillator 302 is coupled to Pin 6 of the controller 100 and to an input of an inverter $U_{10}$. An output of the inverter $U_{10}$ forms a signal $\overline{V}_{CLK2}$ and is coupled to a gate of the transistor $M_4$.

A first terminal of a first secondary winding of the transformer $T_2$ is coupled to an anode of a diode $D_4$. A cathode of the diode $D_4$ is coupled to a drain of a MOS transistor $M_5$. A gate of the transistor $M_5$ is coupled to Pin 7 of the controller 100. A source of the MOS transistor $M_5$ is coupled to a cathode of a diode $D_5$ and to a first terminal of an inductor $L_2$. A second terminal of the inductor $L_2$ is coupled to a first terminal of a capacitor $C_5$, to a first output node, and to a first terminal of a resistor $R_{DIV1}$. A second terminal of the resistor $R_{DIV1}$ is coupled to a first terminal of a resistor $R_{DIV2}$ and to Pin 1 of the integrated circuit controller 100. A second terminal of the resistor $R_{DIV2}$ is coupled to a second ground node. An output voltage $V_{OUT2}$ is formed at the first output node. A second terminal of the secondary winding of the transformer $T_2$ is coupled to an anode of the diode $D_5$, to a first terminal of a sensing resistor $R_{SENSE2}$, and to a first terminal of a resistor $R_{RAMP}$. A second terminal of the resistor $R_{RAMP}$ is coupled to a first terminal of a capacitor $C_{RAMP}$ and to Pin 3 of the controller 100. A second terminal of the capacitor $C_{RAMP}$, a second terminal of the resistor $R_{SENSE2}$ and a second terminal of the capacitor $C_5$ are coupled to the second ground node. A load 304 can be coupled across the capacitor $C_5$. A signal $I_{SENSE2}$ is formed at the second terminal of the resistor $R_{RAMP}$ and is representative of a level of current passing through the secondary winding of the transformer $T_2$ when the transistor $M_5$ is active.

Pin 2 of the controller 100 is coupled to a first terminal of a resistor $R_Z$ and to a first terminal of a capacitor $C_P$. A second terminal of the resistor $R_Z$ is coupled to a first terminal of a capacitor $C_Z$. A second terminal of the capacitor $C_P$ and a second terminal of the capacitor $C_Z$ are coupled to the second ground node. The elements $R_Z$, $C_P$ and $C_Z$ are preferably included for performing compensation/filtering of the current sense ramp $I_{SENSE2}$.

A first terminal of a second secondary winding of the transformer $T_2$ is coupled to an anode of a diode $D_6$. A cathode of the diode $D_6$ is coupled to a first terminal of a capacitor $C_6$, to a second output node, to a second terminal of the resistor $R_7$, to Pin 4 of the controller 100 and to Pin 5 of the controller 100. A supply voltage $V_{CC}$ is formed at the second output node. A second terminal of the second secondary winding of the transformer $T_2$ and a second terminal of the capacitor $C_6$ are coupled to the second ground node.

As shown in FIG. 13, the output voltage $V_{OUT2}$ is coupled to Pin 1 of the integrated circuit controller 100 via a resistive divider formed of the resistors $R_{DIV1}$ and $R_{DIV2}$, whereas, the optical isolator 202 illustrated in FIG. 4 is omitted from FIG. 13. Accordingly, the error signal $V_{EA1}$ is active, whereas, the error signal $V_{DC}$ is not active. The error signal $V_{EA1}$ is representative of a difference between the output voltage $V_{OUT2}$ and a desired level for the output voltage $V_{OUT2}$. The error signal $V_{EA1}$ is utilized by the comparator CMP$_3$ (FIG. 3) for regulating the output voltage $V_{OUT2}$, as explained herein.

Figure 14:
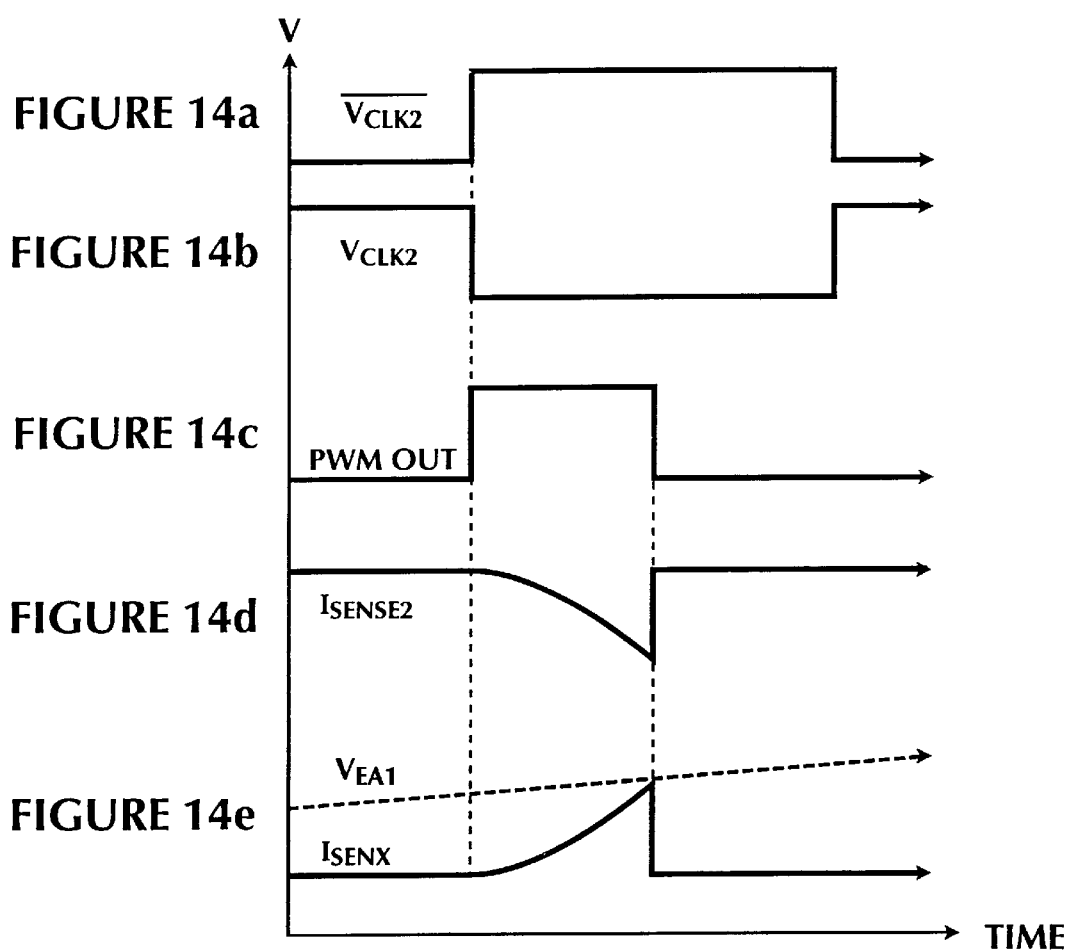
FIGS. 14a–e illustrate timing diagrams for selected signals of the post regulator illustrated in FIG. 13.

FIGS. 14a–d illustrate timing diagrams for selected signals of the post regulator 300 illustrated in FIG. 13. More particularly, FIG. 14a illustrates a timing diagram for the clock signal $\overline{V}_{CLK2}$; FIG. 14b illustrates a timing diagram for the clock signal $V_{CLK2}$; FIG. 14c illustrates a timing diagram for the signal PWM OUT; FIG. 14d illustrates a timing diagram for the signal $I_{SENSE2}$; and FIG. 14e illustrates a timing diagram for the error signal $V_{EA1}$ and a timing diagram for the absolute value of the sensing signal $I_{SENSE2}$, i.e. $|I_{SENSE2}|$.

Note that because the clock signal $V_{CLK2}$ is applied to Pin 6 of the controller 100, the clock signal $V_{CLK1}$ (FIG. 3) is synchronous with the clock signal $V_{CLK2}$. As a result, the transistor $M_5$ (FIG. 13) is controlled synchronously with the transistor $M_4$. This ensures that the first secondary winding of the transformer $T_2$ is energized when the transistor $M_5$ is turned on.

In the preferred embodiment, the clock signals $V_{CLK2}$ and $\overline{V}_{CLK2}$ each have a fifty-percent (50%) duty cycle and are one-hundred-eighty degrees (180°) out of phase with each other, as illustrated in FIGS. 14a–b. When the signal $V_{CLK2}$ is a logical high voltage, the signals $\overline{V}_{CLK2}$ and PWM OUT are each a logical low voltage, as illustrated in FIGS. 14a–c. Formation of the signal PWM OUT is described in above with reference to FIGS. 3 and 5. Because the signals $\overline{V}_{CLK2}$ and PWM OUT are each a logical low voltage, the transistors $M_4$ (FIG. 13) and $M_5$ (FIG. 13) are off. When the clock signal $V_{CLK2}$ transitions to a logical low voltage, the signals $\overline{V}_{CLK2}$ and PWM OUT each transition to a logical high voltage, as shown in FIGS. 14b–c. As a result, the transistors $M_4$ and $M_5$ are turned on. Because the transistors $M_4$ and $M_5$ are both on, current flows in the primary winding of the transformer $T_2$, which induces a current to flow in the secondary windings of the transformer $T_2$.

Current flowing in the first secondary winding of the transformer $T_2$ is drawn through the sensing resistor $R_{SENSE2}$, thereby forming the voltage signal $I_{SENSE2}$. Because the second terminal of the sensing resistor $R_{SENSE2}$ is coupled to the ground node, the signal $I_{SENSE2}$, formed at the first terminal of the sensing resistor $R_{SENSE2}$ is negative is polarity, as shown in FIG. 14d. The current sense circuit 104 (FIG. 3) forms the signal $I_{SENX}$ which is representative of the absolute value of the signal $I_{SENSE2}$. As shown in FIG. 14e, the absolute value of the signal $I_{SENSE2}$ begins to rise upon the clock signal $V_{CLK2}$ transitioning from a logical high voltage to a logical low voltage. When the absolute value of the signal $I_{SENSE2}$ reaches a level of the error signal $V_{EA1}$, as shown in FIG. 14e, then the output of the comparator CMP$_3$ changes from a logic high voltage to a logic low voltage. In response, the signal PWM OUT changes from a logic high voltage to a logic low voltage, as shown in FIG. 14c. This turns the transistor $M_5$ off. This cycle repeats upon a next transition in the clock signal $V_{CLK2}$.

In this manner, operation of the transistor $M_5$ is synchronized with operation of the transistor $M_4$ and a duty cycle for the transistor $M_5$ is controlled so as to regulate the output voltage $V_{OUT2}$. Because the output voltage $V_{OUT2}$ is regulated by controlling the duty cycle of the transistor $M_5$, which is located on the same side of the transformer $T_2$ as the load 304, the power converter illustrated in FIG. 13 is referred to as a post regulator. This is in contrast to the forward converter illustrated in FIG. 4 in which the transistor $M_2$ is located on the opposite side of the transformer $T_1$ from the load 204. An advantage of the controller 100 of the present invention is that it can be utilized for controlling switching in a forward converter or a post regulator without modification.

The above-described regulation of the output voltage $V_{OUT2}$ can be altered or interrupted under certain conditions. For example, in the event of an overvoltage condition, the signal OVP (FIG. 3) transitions from a logic high voltage to a logic low voltage. In response, the AND gate $U_8$ (FIG. 3) holds the transistor $M_5$ (FIG. 13) off, thereby disabling switching of the transistor $M_5$. In addition, under start-up conditions, the soft-start circuit 108 (FIG. 3) ensures that the duty cycle for the transistor $M_5$ is gradually increased. Further, the pulse skip circuit 102 (FIG. 3) temporarily disables the transistor $M_5$ when the load 304 (FIG. 13) draws a low level of current Also the current limit circuit 106 (FIG. 3) disables the transistor $M_5$ when the current through the secondary winding of the transformer $T_2$ becomes excessive.

As mentioned, a feature of the present invention allows the same integrated circuit controller 100 to be utilized in a PWM forward converter 200, as illustrated in FIG. 4, and in a PWM post regulator 300, as illustrated in FIG. 13, by modifying only circuitry external to the integrated circuit 100. An aspect of the invention which is in furtherance of this feature is the current sense circuit 104 (FIG. 3). As mentioned above, the current sense circuit 104 ensures that the signal $I_{SENX}$, which is applied to the comparator CMP$_3$ (FIG. 3), is positive in polarity whether the signal $I_{SENSE1}$ (FIG. 4), which is positive in polarity, or the signal $I_{SENSE2}$ (FIG. 13), which is negative in polarity, is applied to the input of the current sense circuit 104.

Figure 15:
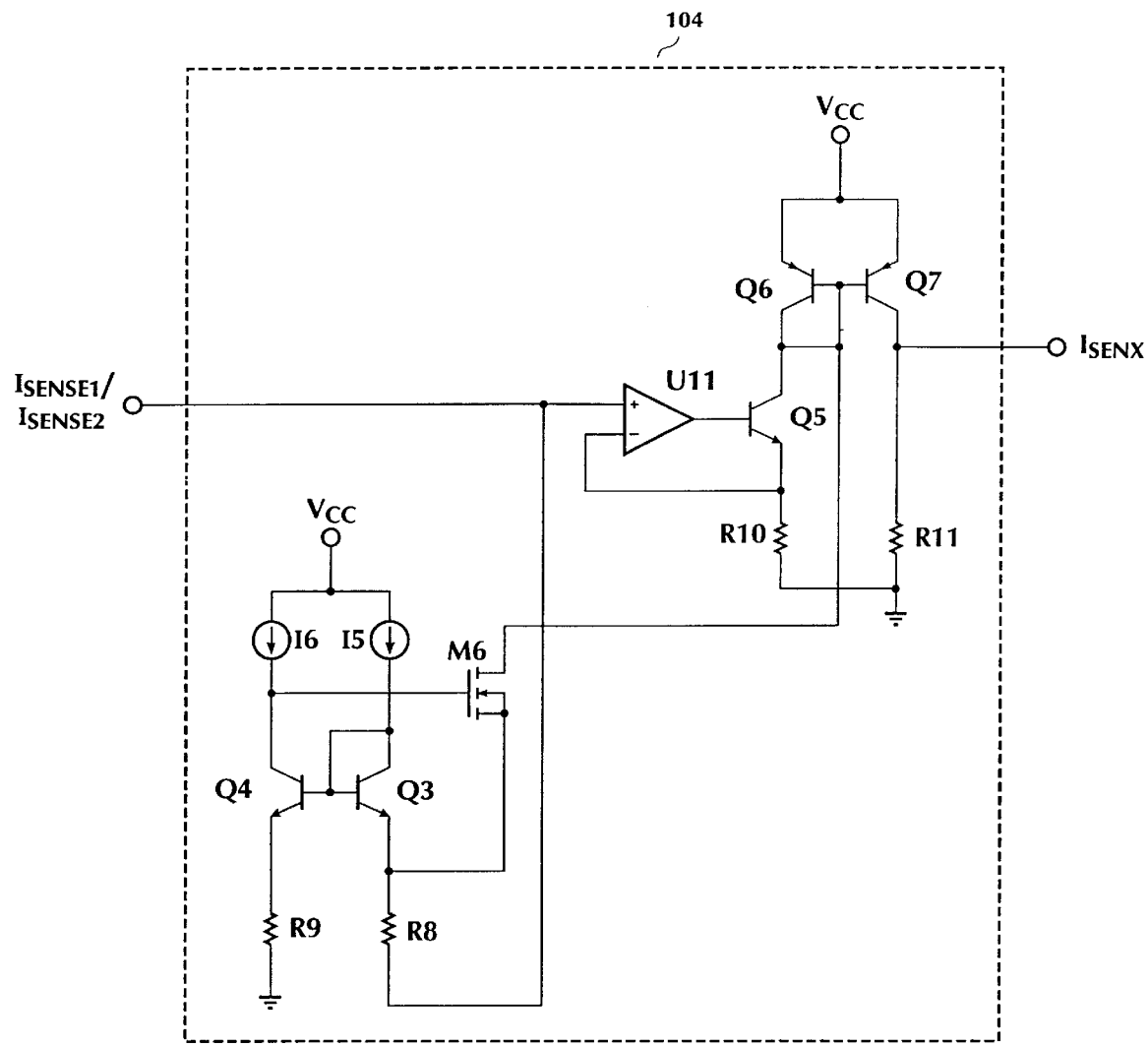
FIG. 15 illustrates a block schematic diagram of the current sense circuit illustrated in FIG. 3.

FIG. 15 illustrates a block schematic diagram of the current sense circuit 104 illustrated in FIG. 3. The signal $I_{SENSE1}$ (FIG. 4) or the signal $I_{SENSE2}$ (FIG. 13) can be coupled to an input terminal of the current sense circuit 104. The input terminal is coupled to a non-inverting input of an amplifier $U_{11}$ and to a first terminal of a resistor $R_8$.

A first terminal of a current source $I_5$ and a first terminal of a current source $I_6$ are coupled to the supply voltage $V_{CC}$. A second terminal of the resistor $R_8$ is coupled to an emitter of a bipolar transistor $Q_3$ and to a drain of a MOS transistor $M_6$. A base of the transistor $Q_3$ is coupled to a base of a bipolar transistor $Q_4$, to a collector of the transistor $Q_3$ and to a second terminal of the current source $I_5$. An emitter of the transistor $Q_4$ is coupled to a first terminal of a resistor $R_9$. A second terminal of the resistor $R_9$ is coupled to the ground node. A collector of the transistor $Q_4$ is coupled to a second terminal of the current source $I_6$ and to a base of the transistor $M_6$.

A drain of the transistor $M_6$ is coupled to a base of a bipolar transistor $Q_6$, to a base of a bipolar transistor $Q_7$, to a collector or the transistor $Q_6$ and to a collector of a bipolar transistor $Q_5$. An emitter of the transistor $Q_6$ and an emitter of the transistor $Q_7$ are coupled to the supply voltage $V_{CC}$. An output of the amplifier $U_{11}$ is coupled to a base of the transistor $Q_5$. An emitter of the transistor $Q_5$ is coupled to an inverting input of the amplifier $U_{11}$ and to a first terminal of a resistor $R_{10}$. A collector of the transistor $Q_7$ is coupled to a first terminal of a resistor $R_{11}$. A second terminal of the resistor $R_{10}$ and a second terminal of the resistor $R_{11}$ are coupled to the ground node. The signal $I_{SENX}$ is formed at the first terminal of the resistor $R_{11}$. In the preferred embodiment, the resistors $R_8$, $R_9$, $R_{10}$ and $R_{11}$ are equal in value. In addition, the current sources $I_5$ and $I_6$ preferably provide equal currents.

The signal $I_{SENSE1}$ is preferably a positive value which is normally within a range of zero to 1.5 volts. When a positive voltage signal, such as the signal $I_{SENSE1}$, is coupled to the input terminal of the current sense circuit 104 the amplifier $U_{11}$ turns on the transistor $Q_5$. In addition, the transistor $M_6$ is off due to its gate-to-source voltage being negative. A voltage formed at the first terminal of the resistor $R_{10}$ is substantially proportional to the signal $I_{SENSE1}$. A current through the resistor $R_{10}$ is, therefore, also substantially proportional to the signal $I_{SENSE1}$ and is mirrored by the transistors $Q_6$ and $Q_7$ such that a current which flows through the transistor $Q_7$ and the resistor $R_{11}$ is substantially proportional to the signal $I_{SENSE1}$. Because the current through the resistor $R_{11}$ is substantially proportional to the signal $I_{SENSE1}$, the voltage signal $I_{SENX}$ which is formed at the first terminal of the resistor $R_{10}$ is also substantially proportional to the signal $I_{SENSE1}$.

When a signal of zero volts is applied to the input terminal of the current sense circuit 104, the transistor $Q_5$ is turned off by the amplifier $U_{11}$. In addition, the transistor $M_6$ is substantially off due to its gate-to-source voltage being less than is required to turn on the transistor $M_6$. Accordingly, the output signal $I_{SENX}$ is also zero volts. An offset voltage, e.g., 100 mV, can be inserted in series with the non-inverting input of the amplifier $U_{11}$ to ensure that, under such conditions, the transistor $Q_5$ is off.

The signal $I_{SENSE2}$ is preferably a negative value which is normally within the range of −100 mV to zero volts. When a negative voltage signal, such as the signal $I_{SENSE2}$, is applied to the input terminal of the current sense circuit 104, the amplifier $U_{11}$ holds the transistor $Q_5$ off. In addition, the transistor $M_6$ is turned on as its gate-to-source voltage is pulled down by the signal $I_{SENSE2}$. A voltage at the drain of the transistor $M_6$ is substantially equal to the signal $I_{SENSE2}$. This turns on the transistors $Q_6$ and $Q_7$. The transistors $Q_6$ and $Q_7$ form a current mirror such that each draws a current from $V_{CC}$ which is substantially proportional to the signal $I_{SENSE2}$. The current through the transistor $Q_7$ forms the output signal $I_{SENX}$ across the resistor $R_{11}$ as a positive value which is substantially proportional to the input signal $I_{SENSE2}$.

Accordingly, the signal $I_{SENX}$ is representative of the absolute value of the signal $I_{SENSE1}$ or $I_{SENSE2}$ applied to the input of the current sense circuit 104.

Figure 16:
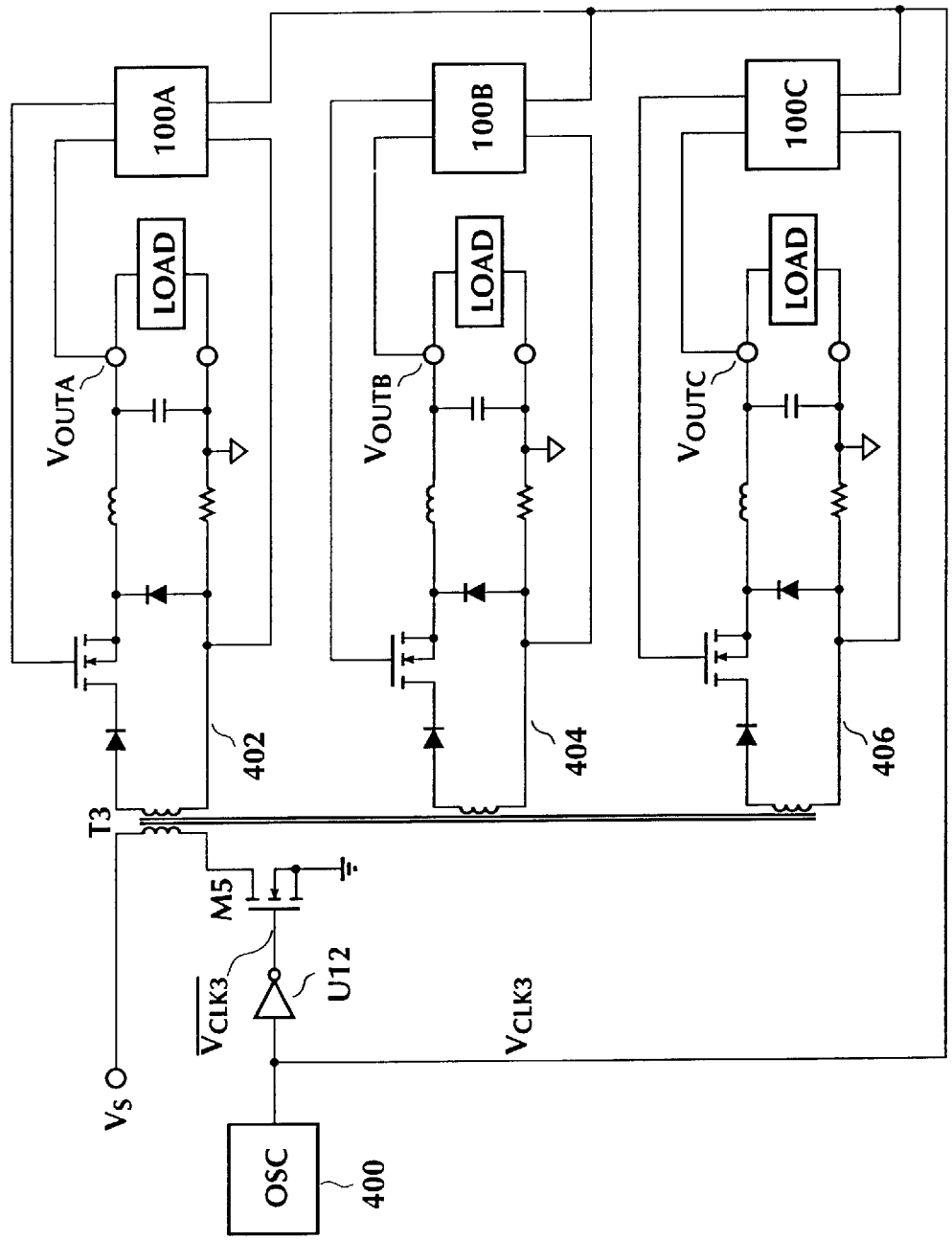
FIG. 16 illustrates a power converter circuit in accordance with the present invention including multiple post-regulators coupled to respective windings of a single transformer.

According to yet another aspect of the present invention, one or more additional post regulators 300, as shown in FIG. 13, can be coupled to respective secondary windings of a single transformer. FIG. 16 illustrates a power converter circuit in accordance with the present invention including multiple post-regulators coupled to respective windings of a single transformer. As illustrated in FIG. 16, a voltage source $V_S$ is coupled to a first terminal of a primary winding of a transformer $T_3$. A second terminal of the primary winding of the transformer $T_3$ is coupled to a drain of a MOS transistor $M_5$. A source of the transistor $M_5$ is coupled to a first ground node. An output $V_{CLK3}$ of an oscillator 400 is coupled to an input of an inverter $U_{12}$ and to each of three controllers 100A, 100B and 100C. An output of the inverter $U_{12}$ forms a clock signal $\overline{V}_{CLK3}$ which is coupled to control the gate of the transistor $M_5$. Preferably, the clock signals $V_{CLK3}$ and $\overline{V}_{CLK3}$ each have a fifty-percent (50%) duty cycle and are one-hundred-eighty degrees (180°) out of phase with each other.

Each controller 100A, 100B, and 100C can be identical to the controller 100 illustrated in FIG. 3. A first secondary winding of the transformer $T_3$ is coupled to a first post-regulator 402 which is controlled by the controller 100A in a manner identical to the post regulator 300 illustrated in FIG. 13 for forming an output voltage $V_{OUTA}$. A second secondary winding of the transformer $T_3$ is coupled to a second post-regulator 404 which is controlled by the controller 100B in a manner identical to the post regulator 300 illustrated in FIG. 13 for forming an output voltage $V_{OUTB}$. A third secondary winding of the transformer $T_3$ is coupled to a third post-regulator 406 which is controlled by the controller 100B in a manner identical to the post regulator 300 illustrated in FIG. 13 for forming an output voltage $V_{OUTC}$. Each of the output voltages $V_{OUTA}$, $V_{OUTB}$, and $V_{OUTC}$ can be regulated at a different level depending upon the requirements of the respective loads. While three post regulators 402, 404, and 406 are shown, it will be apparent that the present invention can be practiced with another number.

In an alternate embodiment, the clock signal supplied to the SYNC input of the controller 100 (or controllers 100A-C) is supplied by a prior power converter stage. For example, the prior power converter stage can be a power factor correction (PFC) converter.

A suitable PFC converter is described in the related parent application of which this application is a continuation-in-part.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the device of the present invention could be implemented in several different ways and the apparatus disclosed above is only illustrative of the preferred embodiment of the invention and is in no way a limitation. For example, it would be within the scope of the invention to vary the values of the various components, current levels, and voltage levels disclosed herein.

What is claimed is:

1. A power converter having a magnetic element and a switch for selectively interrupting a current through the magnetic element thereby forming an output voltage wherein a controller for the switch comprises:
   a. a control means coupled to the switch for controlling a duty cycle of the switch for regulating the output voltage; and
   b. switching inhibiting means comprising a pulse skip circuit for generating a logic signal to inhibit switching of the switch when a difference between the output voltage and a desired level for the output voltage falls below a threshold and wherein the threshold is inversely related to a supply voltage.

2. The power converter according to claim 1 wherein the supply voltage is representative of a level of an input voltage provided to the power converter.

3. The power converter according to claim 2 wherein the supply voltage is formed by the power converter.

4. The power converter according to claim 1 wherein the threshold ($V_{SKIP}$) is given by:

$$V_{SKIP} = K_1 - (K_2 * V_{CC}),$$

where $K_1$ and $K_2$ are constants and $V_{CC}$ is the supply voltage.

5. A power converter having a magnetic element and a switch for selectively interrupting a current through the magnetic element thereby forming an output voltage wherein a controller for the switch comprises:
   a. first sensor for sensing a current through the magnetic element;
   b. second sensor for sensing the output voltage;
   c. a switch control circuit coupled to the first sensor and to the second sensor for controlling a duty cycle of the switch based upon the current and the output voltage; and
   d. switching inhibiting circuit comprising a pulse skip circuit for generating a logic signal to inhibit switching of the switch when a difference between the output voltage and a desired level for the output voltage falls below a threshold and wherein the threshold is inversely related to a supply voltage.

6. The power converter according to claim 5 wherein the supply voltage is representative of a level of an input voltage provided to the power converter.

7. The power converter according to claim 6 wherein the supply voltage is formed by the power converter.

8. The power converter according to claim 5 wherein the threshold ($V_{SKIP}$) is given by:

$$V_{SKIP} = K_1 - (K_2 * V_{CC}),$$

where $K_1$ and $K_2$ are constants and $V_{CC}$ is the supply voltage.

* * * * *